(12) United States Patent
Taras et al.

(10) Patent No.: US 10,935,260 B2
(45) Date of Patent: Mar. 2, 2021

(54) HEAT PUMP WITH DEHUMIDIFICATION

(71) Applicant: Climate Master, Inc., Oklahoma City, OK (US)

(72) Inventors: Michael F. Taras, Oklahoma City, OK (US); Puya Javidmand, Oklahoma City, OK (US)

(73) Assignee: Climate Master, Inc., Oklahoma City, OK (US)

( * ) Notice: Subject to any disclaimer, the term of this patent is extended or adjusted under 35 U.S.C. 154(b) by 72 days.

(21) Appl. No.: 16/213,338

(22) Filed: Dec. 7, 2018

(65) Prior Publication Data
US 2019/0178509 A1 Jun. 13, 2019

Related U.S. Application Data

(60) Provisional application No. 62/597,719, filed on Dec. 12, 2017.

(51) Int. Cl.
*F24F 3/14* (2006.01)
*F25B 30/02* (2006.01)
(Continued)

(52) U.S. Cl.
CPC ............ *F24F 3/1405* (2013.01); *F24F 3/153* (2013.01); *F24F 11/0008* (2013.01); *F25B 6/04* (2013.01);
(Continued)

(58) Field of Classification Search
CPC ...... F24F 3/1405; F24F 11/0008; F24F 3/153; F24F 2003/1446; F24F 2003/1452
See application file for complete search history.

(56) References Cited

U.S. PATENT DOCUMENTS 3,460,353 A * 8/1969 Ogata ..................... F25B 13/00
62/176.5
3,916,638 A 11/1975 Schmidt
(Continued)

FOREIGN PATENT DOCUMENTS

CA 1178268 11/1984
CN 1987397 A 6/2007
(Continued)

OTHER PUBLICATIONS

"Heat pumps in residential and commercial buildings" http://www.heatpumpcentre.org/en/aboutheatpumps/heatpumpsinresidential/Sidor/default.aspx (Accessed Apr. 20, 2011) (2 pages).
(Continued)

*Primary Examiner* — Nelson J Nieves
(74) *Attorney, Agent, or Firm* — Neal, Gerber & Eisenberg LLP; Thomas E. Williams

(57) ABSTRACT

Various embodiments of a heat pump system are disclosed to provide improved and flexible heat pump operation when dehumidification of the conditioned space is required. In one embodiment, a heat pump system includes a heat pump loop comprising a refrigerant circuit that fluidly interconnects (1) a compressor; (2) a source heat exchanger; (3) a source heat exchanger bypass circuit comprising a bypass valve; (4) a space heat exchanger; (5) a reversing valve positioned on the discharge side of the compressor; (6) a reheat circuit comprising a reheat heat exchanger; (7) first and second expansion devices; and (8) first and second expansion device bypass circuits configured to allow refrigerant to bypass the first and second expansion devices, respectively, where the first and second bypass circuits include first and second check valves, respectively; and (9) a 3-way valve configured to selectively direct refrigerant flow to the first expansion device, the reheat circuit, and the second expansion device.

14 Claims, 10 Drawing Sheets

(51) Int. Cl.
  *F25B 41/04* (2006.01)
  *F24F 11/00* (2018.01)
  *F25B 40/02* (2006.01)
  *F25B 41/06* (2006.01)
  *F24F 3/153* (2006.01)
  *F25B 6/04* (2006.01)
  *F25B 13/00* (2006.01)

(52) U.S. Cl.
  CPC .............. *F25B 13/00* (2013.01); *F25B 30/02* (2013.01); *F25B 40/02* (2013.01); *F25B 41/04* (2013.01); *F25B 41/046* (2013.01); *F25B 41/062* (2013.01); *F24F 2003/1446* (2013.01); *F24F 2003/1452* (2013.01); *F25B 2313/005* (2013.01); *F25B 2313/0212* (2013.01); *F25B 2313/0292* (2013.01); *F25B 2400/0403* (2013.01); *F25B 2400/0411* (2013.01)

(56) References Cited

U.S. PATENT DOCUMENTS

| | | | |
|---|---|---|---|
| 3,938,352 A | 2/1976 | Schmidt | |
| 4,072,187 A | 2/1978 | Lodge | |
| 4,173,865 A * | 11/1979 | Sawyer | F25B 13/00 62/324.6 |
| 4,179,894 A | 12/1979 | Hughes | |
| 4,299,098 A | 11/1981 | Derosier | |
| 4,399,664 A | 8/1983 | Derosier | |
| 4,441,901 A * | 4/1984 | Endoh | F24F 5/001 165/240 |
| 4,493,193 A | 1/1985 | Fisher | |
| 4,528,822 A | 7/1985 | Glamm | |
| 4,538,418 A | 9/1985 | Lawrence et al. | |
| 4,575,001 A | 3/1986 | Oskarsson et al. | |
| 4,592,206 A | 6/1986 | Yamazaki et al. | |
| 4,598,557 A | 7/1986 | Robinson et al. | |
| 4,645,908 A | 2/1987 | Jones | |
| 4,646,538 A | 3/1987 | Blackshaw et al. | |
| 4,693,089 A | 9/1987 | Bourne et al. | |
| 4,727,727 A | 3/1988 | Reedy | |
| 4,766,734 A | 8/1988 | Dudley | |
| 4,776,180 A | 10/1988 | Patton et al. | |
| 4,796,437 A | 1/1989 | James | |
| 4,798,059 A | 1/1989 | Morita | |
| 4,835,976 A | 6/1989 | Torrence | |
| 4,856,578 A | 8/1989 | McCahill | |
| 4,893,476 A | 1/1990 | Bos et al. | |
| 4,920,757 A | 5/1990 | Gazes et al. | |
| 4,924,681 A | 5/1990 | De Vit et al. | |
| 4,938,032 A * | 7/1990 | Mudford | F25B 13/00 62/160 |
| 5,038,580 A | 8/1991 | Hart | |
| 5,044,425 A * | 9/1991 | Tatsumi | F24F 1/0003 165/240 |
| 5,081,848 A | 1/1992 | Rawlings et al. | |
| 5,088,296 A | 2/1992 | Hamaoka | |
| 5,099,651 A | 3/1992 | Fischer | |
| 5,136,855 A | 8/1992 | Lenarduzzi | |
| 5,172,564 A | 12/1992 | Reedy | |
| 5,187,944 A | 2/1993 | Jarosch | |
| 5,224,357 A | 7/1993 | Galiyano et al. | |
| 5,305,822 A * | 4/1994 | Kogetsu | F24F 3/1405 165/225 |
| 5,309,732 A | 5/1994 | Sami | |
| 5,323,844 A | 6/1994 | Sumitani et al. | |
| 5,339,890 A | 8/1994 | Rawlings | |
| 5,355,688 A | 10/1994 | Rafalovich et al. | |
| 5,372,016 A | 12/1994 | Rawlings | |
| 5,438,846 A | 8/1995 | Datta | |
| 5,461,876 A | 10/1995 | Dressler | |
| 5,465,588 A | 11/1995 | McCahill et al. | |
| 5,477,914 A | 12/1995 | Rawlings | |
| 5,497,629 A | 3/1996 | Rafalovich et al. | |
| 5,507,337 A | 4/1996 | Rafalovich et al. | |
| 5,533,355 A | 7/1996 | Rawlings | |
| 5,564,282 A | 10/1996 | Kaye | |
| 5,613,372 A | 3/1997 | Beal et al. | |
| 5,619,864 A | 4/1997 | Reedy | |
| 5,628,200 A | 5/1997 | Pendergrass | |
| 5,651,265 A | 7/1997 | Grenier | |
| 5,669,224 A | 9/1997 | Lenarduzzi | |
| 5,689,966 A | 11/1997 | Zess et al. | |
| 5,729,985 A | 3/1998 | Yoshihara et al. | |
| 5,758,514 A | 6/1998 | Genung et al. | |
| 5,802,864 A | 9/1998 | Yarbrough et al. | |
| 5,927,088 A | 7/1999 | Shaw | |
| 6,032,472 A | 3/2000 | Heinrichs et al. | |
| 6,070,423 A | 6/2000 | Hebert | |
| 6,082,125 A | 7/2000 | Savtchenko | |
| 6,123,147 A * | 9/2000 | Pittman | F24F 3/153 165/228 |
| 6,149,066 A | 11/2000 | Perry et al. | |
| 6,167,715 B1 | 1/2001 | Hebert | |
| 6,227,003 B1 | 5/2001 | Smolinsky | |
| 6,253,564 B1 | 7/2001 | Yarbrough et al. | |
| 6,347,527 B1 | 2/2002 | Bailey et al. | |
| 6,385,983 B1 | 5/2002 | Sakki et al. | |
| 6,418,745 B1 | 7/2002 | Ratliff | |
| 6,434,960 B1 | 8/2002 | Rousseau | |
| 6,474,087 B1 | 11/2002 | Lifson | |
| 6,536,221 B2 | 3/2003 | James | |
| 6,655,164 B2 | 12/2003 | Rogstam | |
| 6,662,864 B2 | 12/2003 | Burk et al. | |
| 6,694,750 B1 | 2/2004 | Lifson et al. | |
| 6,729,151 B1 | 5/2004 | Thompson | |
| 6,751,972 B1 | 6/2004 | Jungwirth | |
| 6,804,975 B2 | 10/2004 | Park | |
| 6,817,205 B1 | 11/2004 | Lifson et al. | |
| 6,826,921 B1 * | 12/2004 | Uselton | F24F 3/153 62/176.6 |
| 6,857,285 B2 | 2/2005 | Hebert | |
| 6,892,553 B1 | 5/2005 | Lifson et al. | |
| 6,915,656 B2 | 7/2005 | Ratliff | |
| 6,931,879 B1 | 8/2005 | Wiggs | |
| 6,938,438 B2 | 9/2005 | Lifson et al. | |
| 6,941,770 B1 | 9/2005 | Taras et al. | |
| 7,000,423 B2 | 2/2006 | Lifson et al. | |
| 7,059,151 B2 | 6/2006 | Taras et al. | |
| 7,114,349 B2 | 10/2006 | Lifson et al. | |
| 7,150,160 B2 | 12/2006 | Herbert | |
| 7,155,922 B2 | 1/2007 | Harmon et al. | |
| 7,185,505 B2 | 3/2007 | Kamimura | |
| RE39,597 E | 5/2007 | Rousseau | |
| 7,210,303 B2 | 5/2007 | Zhang et al. | |
| 7,228,707 B2 | 6/2007 | Lifson et al. | |
| 7,234,311 B2 | 6/2007 | Lifson et al. | |
| 7,254,955 B2 | 8/2007 | Otake et al. | |
| 7,263,848 B2 | 9/2007 | Bhatti | |
| 7,272,948 B2 | 9/2007 | Taras et al. | |
| 7,275,385 B2 | 10/2007 | Abel et al. | |
| 7,325,414 B2 | 2/2008 | Taras et al. | |
| 7,484,374 B2 | 2/2009 | Pham et al. | |
| 7,617,697 B2 | 11/2009 | McCaughan | |
| 7,654,104 B2 | 2/2010 | Groll et al. | |
| 7,716,943 B2 | 5/2010 | Seefeldt | |
| 7,770,405 B1 * | 8/2010 | Dillon | F24F 3/153 236/44 C |
| 7,823,404 B2 * | 11/2010 | Hanson | F25B 5/04 137/493 |
| 7,845,190 B2 | 12/2010 | Pearson | |
| 7,854,137 B2 | 12/2010 | Lifson et al. | |
| 7,856,834 B2 | 12/2010 | Haley | |
| 7,913,501 B2 | 3/2011 | Ellis et al. | |
| 7,937,960 B2 | 5/2011 | Matsui | |
| 7,958,737 B2 | 6/2011 | Lifson et al. | |
| 7,975,495 B2 * | 7/2011 | Voorhis | F24F 3/153 62/176.6 |
| 7,975,506 B2 | 7/2011 | James et al. | |
| 7,997,092 B2 | 8/2011 | Lifson et al. | |
| 8,037,713 B2 | 10/2011 | Haley et al. | |
| 8,074,459 B2 | 12/2011 | Murakami et al. | |
| 8,079,228 B2 | 12/2011 | Lifson et al. | |
| 8,079,229 B2 | 12/2011 | Lifson et al. | |

(56) References Cited

U.S. PATENT DOCUMENTS

| | | | |
|---|---|---|---|
| 8,082,751 B2 | 12/2011 | Wiggs | |
| 8,136,364 B2 | 3/2012 | Lifson et al. | |
| 8,191,376 B2 | 6/2012 | Fox et al. | |
| 8,220,531 B2 | 7/2012 | Murakami et al. | |
| 8,418,482 B2 | 4/2013 | Bush et al. | |
| 8,418,486 B2 | 4/2013 | Taras et al. | |
| 8,424,326 B2 | 4/2013 | Mitra et al. | |
| 8,459,052 B2 | 6/2013 | Bush et al. | |
| 8,528,359 B2 | 9/2013 | Lifson et al. | |
| 8,561,425 B2 | 10/2013 | Mitra et al. | |
| 8,650,893 B2* | 2/2014 | Hanson | F25B 5/04 62/222 |
| 8,733,429 B2 | 5/2014 | Harrison et al. | |
| 8,756,943 B2 | 6/2014 | Chen et al. | |
| 8,769,982 B2 | 7/2014 | Ignatiev et al. | |
| 8,984,903 B2* | 3/2015 | Itoh | F24F 3/1405 62/196.1 |
| 9,052,125 B1 | 6/2015 | Dostal | |
| 9,562,700 B2* | 2/2017 | Watanabe | F24F 3/153 |
| 10,072,856 B1 | 9/2018 | Akin et al. | |
| 10,118,462 B2* | 11/2018 | Kohigashi | B60H 1/22 |
| 10,119,738 B2 | 11/2018 | Hammond et al. | |
| 10,345,004 B1 | 7/2019 | Hern et al. | |
| 2003/0221445 A1 | 12/2003 | Smolinsky | |
| 2006/0010908 A1 | 1/2006 | Taras et al. | |
| 2006/0218949 A1 | 10/2006 | Ellis et al. | |
| 2006/0225445 A1 | 10/2006 | Lifson et al. | |
| 2007/0074536 A1 | 4/2007 | Bai | |
| 2007/0289319 A1 | 12/2007 | Kim et al. | |
| 2007/0295477 A1 | 12/2007 | Mueller et al. | |
| 2008/0016895 A1 | 1/2008 | Kim et al. | |
| 2008/0041072 A1 | 2/2008 | Seefeldt | |
| 2008/0173034 A1 | 7/2008 | Shaw | |
| 2008/0196418 A1 | 8/2008 | Lifson et al. | |
| 2008/0197206 A1 | 8/2008 | Murakami et al. | |
| 2008/0209930 A1 | 9/2008 | Taras et al. | |
| 2008/0256975 A1 | 10/2008 | Lifson et al. | |
| 2008/0282718 A1 | 11/2008 | Beagle | |
| 2008/0296396 A1 | 12/2008 | Corroy et al. | |
| 2008/0302113 A1 | 12/2008 | Yin et al. | |
| 2008/0302118 A1 | 12/2008 | Chen et al. | |
| 2008/0302129 A1 | 12/2008 | Mosemann et al. | |
| 2008/0307813 A1 | 12/2008 | Lifson et al. | |
| 2009/0107656 A1 | 4/2009 | Marois | |
| 2009/0208331 A1 | 8/2009 | Haley et al. | |
| 2009/0294097 A1 | 12/2009 | Rini et al. | |
| 2009/0314014 A1 | 12/2009 | Ericsson | |
| 2010/0005831 A1 | 1/2010 | Vaisman et al. | |
| 2010/0024470 A1 | 2/2010 | Lifson et al. | |
| 2010/0058781 A1 | 3/2010 | Lifson et al. | |
| 2010/0064710 A1 | 3/2010 | Slaughter | |
| 2010/0064722 A1 | 3/2010 | Taras | |
| 2010/0077788 A1 | 4/2010 | Lewis | |
| 2010/0114384 A1 | 5/2010 | Maxwell | |
| 2010/0132399 A1 | 6/2010 | Mitra et al. | |
| 2010/0199715 A1 | 8/2010 | Lifson et al. | |
| 2010/0251750 A1 | 10/2010 | Lifson et al. | |
| 2010/0281894 A1 | 11/2010 | Huff | |
| 2010/0287969 A1 | 11/2010 | Ueda et al. | |
| 2010/0326100 A1 | 12/2010 | Taras et al. | |
| 2011/0023515 A1 | 2/2011 | Kopko et al. | |
| 2011/0036119 A1 | 2/2011 | Fujimoto et al. | |
| 2011/0041523 A1 | 2/2011 | Taras et al. | |
| 2011/0061413 A1 | 3/2011 | Setoguchi | |
| 2011/0079032 A1* | 4/2011 | Taras | F28D 1/05391 62/113 |
| 2011/0088426 A1 | 4/2011 | Lochtefeld | |
| 2011/0094248 A1 | 4/2011 | Taras et al. | |
| 2011/0094259 A1 | 4/2011 | Lifson et al. | |
| 2011/0132007 A1 | 6/2011 | Weyna et al. | |
| 2011/0174014 A1 | 7/2011 | Scarcella et al. | |
| 2011/0203299 A1 | 8/2011 | Jing et al. | |
| 2011/0209490 A1 | 9/2011 | Mijanovic et al. | |
| 2011/0259025 A1 | 10/2011 | Noh et al. | |
| 2011/0289950 A1 | 12/2011 | Kim et al. | |
| 2011/0289952 A1 | 12/2011 | Kim et al. | |
| 2012/0011866 A1 | 1/2012 | Scarcella et al. | |
| 2012/0067965 A1 | 3/2012 | Rajasekaran et al. | |
| 2012/0103005 A1 | 5/2012 | Kopko et al. | |
| 2012/0198867 A1 | 8/2012 | Ng et al. | |
| 2012/0205077 A1 | 8/2012 | Zinger et al. | |
| 2012/0247134 A1 | 10/2012 | Gurin | |
| 2012/0291460 A1 | 11/2012 | Aoyagi | |
| 2013/0014451 A1 | 1/2013 | Russell et al. | |
| 2013/0031934 A1 | 2/2013 | Huff et al. | |
| 2013/0098085 A1 | 4/2013 | Judge et al. | |
| 2013/0104574 A1 | 5/2013 | Dempsey et al. | |
| 2013/0180266 A1 | 7/2013 | Bois | |
| 2013/0269378 A1 | 10/2013 | Wong | |
| 2013/0305756 A1 | 11/2013 | Gomes et al. | |
| 2014/0013782 A1 | 1/2014 | Kopko et al. | |
| 2014/0013788 A1 | 1/2014 | Kopko et al. | |
| 2014/0033753 A1 | 2/2014 | Lu et al. | |
| 2014/0033755 A1 | 2/2014 | Wong | |
| 2014/0053585 A1 | 2/2014 | Huff | |
| 2014/0060101 A1 | 3/2014 | Styles et al. | |
| 2014/0123689 A1 | 5/2014 | Ellis et al. | |
| 2014/0245770 A1 | 9/2014 | Chen et al. | |
| 2014/0260392 A1 | 9/2014 | Hawkins et al. | |
| 2015/0052937 A1* | 2/2015 | Hung | F24F 3/153 62/498 |
| 2015/0059373 A1 | 3/2015 | Maiello et al. | |
| 2015/0204586 A1 | 7/2015 | Burg et al. | |
| 2017/0010029 A9 | 1/2017 | Reytblat et al. | |
| 2017/0227250 A1 | 8/2017 | Karamanos | |
| 2018/0010829 A1 | 1/2018 | Taras et al. | |
| 2018/0128506 A1 | 5/2018 | Taras et al. | |
| 2018/0313555 A1* | 11/2018 | Henderson | F24F 11/0008 |

FOREIGN PATENT DOCUMENTS

| | | |
|---|---|---|
| CN | 201944952 U | 8/2011 |
| CN | 102353126 A | 2/2012 |
| CN | 203231582 U | 10/2013 |
| CN | 103471275 A | 12/2013 |
| CN | 203396155 U | 1/2014 |
| CN | 203432025 U | 2/2014 |
| EP | 134015 | 3/1985 |
| EP | 1983275 A1 | 10/2008 |
| JP | 2000016417 | 2/2000 |
| JP | 2000274786 | 10/2000 |
| JP | 2000314563 | 11/2000 |
| JP | 2001248931 | 9/2001 |
| KR | 100963221 B1 | 6/2010 |
| WO | 9600370 | 1/1996 |
| WO | 2001/90663 | 11/2001 |
| WO | 2006/033782 | 3/2006 |
| WO | 2008/045086 | 4/2008 |
| WO | 2008/048252 | 4/2008 |
| WO | 2010/005918 | 1/2010 |
| WO | 2010/054498 | 5/2010 |
| WO | 2010/104709 | 9/2010 |
| WO | 2013/142760 | 9/2013 |
| WO | 2014/031559 A1 | 2/2014 |
| WO | 2014/031708 A1 | 2/2014 |

OTHER PUBLICATIONS

"Heat Pump Mechanics" http://www.geo4va.vt.edu/A3/A3.htm#A3sec3c (Accessed Apr. 20, 2011) (19pages).

Murphy et al., "Air-Source Integrated Heat Pump for Net-Zero-Energy Houses Technology Status Report," *Oak Ridge National Laboratory*, ORNL-TM-2007-112 (Jul. 2007) (93 pages).

Murphy et al., "Ground-Source Integrated Heat Pump for Net-Zero-Energy Houses Technology Status Report," *Oak Ridge National Laboratory*, ORNL-TM-2007-177 (Dec. 2007) (78 pages).

Korean Intellectual Property Office, International Search Report in International Application No. PCT/US2009/049734 (dated Jan. 20, 2010) (2 pages).

Korean Intellectual Property Office, International Search Report in International Application No. PCT/US2010/026010 (dated Sep. 28, 2010) (2 pages).

(56) References Cited

OTHER PUBLICATIONS

"134-XS and 134-S Series Compressors ECOnomizer (EA-12-03-E)," 134-XS and 134-S series—Application and Maintenance Manual, Technical report EA1203E, RefComp Refrigerant Compressors, undated but believed to be publicly available at least as early as Mar. 2014 (4 pages).

B.P. Rasmussen et al., "Model-Driven System Identification of Transcritical Vapor Compression Systems," IEEE Transactions on Control Systems Technology, May 2005, pp. 444-451, vol. 13 (8 pages).

"Economized Vapor Injection (EVI) Compressors," Emerson Climate Technologies Application Engineering Bulletin AE4-1327 R2, Revised Sep. 2006 (9 pages).

Ekaterina VI Nogradova, "Economizers in Chiller Systems," Bachelors Thesis, Mikkelin Ammattikorkeakoulu, Nov. 2012 (50 pages).

"Enhanced Vapour Injection (EVI) for ZH*KVE Scroll Compressors," Emerson Climate Technologies—Technical Information, C7.4.3/1107-0512/E, May 2012 (10 pages).

Haraldsson et al., "Measurement of Performance and Evaluation of a Heat Pump—with Scroll Compressor EVI and Economizer," Lunds Institute of Technology, 2006 (4 pages).

John P. Elson et al., "Scroll Technology: An Overview of Past, Present and Future Developments," International Compressor Engineering Conference, 2008, Paper 1871 (9 pages).

Lund et al., "Geothermal (Ground-Source Heat Pumps—A World Overview," GHC Bulletin, Sep. 2004 (edited and updated version of the article from Renewal Energy World, (Jul.-Aug. 2003), vol. 6 No. 4) (10 pages).

Tolga N. Aynur, "Variable Refrigerant Flow Systems: A Review, Energy and Buildings," Jan. 2010, pp. 1106-1112, vol. 42 (7 pages).

Wei Yang et al., "The Design Method of U-Bend Geothermal Heat Exchanger of DX-GCHP in Cooling Model," IEEE, 2011, pp. 3635-3637 (English Abstract) (3 pages).

International Search Report and Written Opinion issued in International Application No. PCT/US2013/033433 dated Aug. 9, 2013 (11 Pages).

International Preliminary Report on Patentability issued in International Application No. PCT/US2013/033433 dated Sep. 23, 2014 (7 Pages).

Third Party Submission dated Nov. 10, 2014 filed in U.S. Appl. No. 13/848,342 (13 Pages).

Honeywell, VFF1, VFF2, VFF3, VFF6 Resilient Seat Butterfly Valves with Flanged Connections Jan. 2013, p. 1, 1st column, last paragraph. (Year: 2013) (20 pages).

Taras, Michael F., "Reheat Which Concept is Best," *ASHRAE Journal*: 35-40 (Dec. 2004) (7 pages).

\* cited by examiner

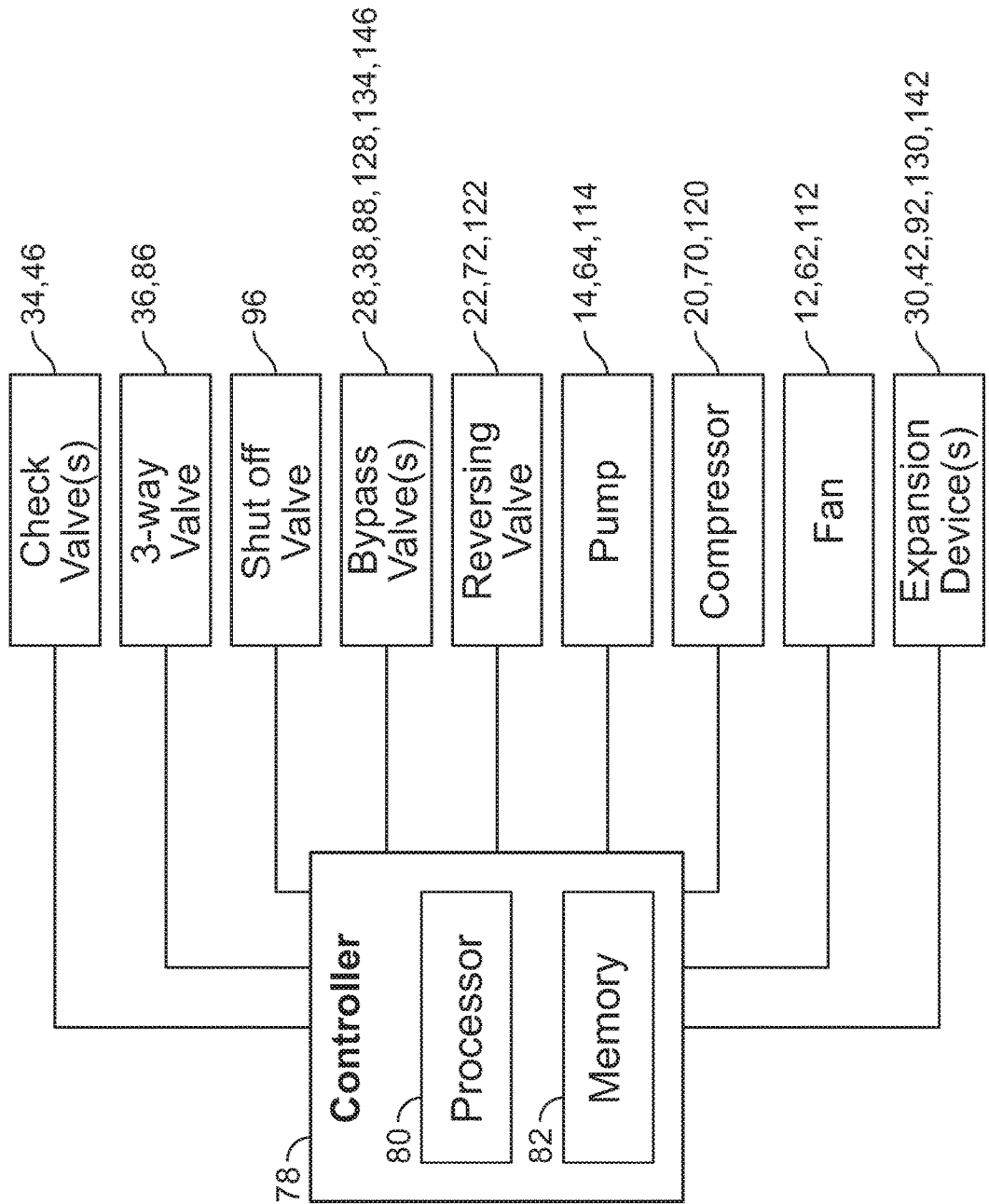

HEAT PUMP WITH DEHUMIDIFICATION

CROSS REFERENCE TO RELATED APPLICATIONS

This application claims the benefit of U.S. Provisional Patent Application Ser. No. 62/597,719, filed Dec. 12, 2017, which is incorporated by reference herein in its entirety.

BACKGROUND

The instant disclosure relates generally to heating, ventilation, and air conditioning systems and methods and, more particularly but without limitation, to heat pump systems.

SUMMARY

Disclosed are various embodiments of heat pump systems and methods of operating the heat pump systems for conditioning air in a space.

In one embodiment, a heat pump system for conditioning air in a space includes a heat pump loop comprising a refrigerant circuit that fluidly interconnects: (1) a compressor having a discharge outlet port and an inlet suction port; (2) a source heat exchanger operable as either a condenser or an evaporator; (3) a source heat exchanger bypass circuit comprising a bypass valve to modulate refrigerant flow through the source heat exchanger; (4) a space heat exchanger operable as either an evaporator or a condenser for cooling or heating the air in the space; (5) a reversing valve positioned on the discharge side of the compressor and configured to alternately direct refrigerant flow from the discharge outlet port of the compressor to one of the source heat exchanger and the space heat exchanger and to alternately return flow from the other of the source heat exchanger and the space heat exchanger to the suction inlet port of the compressor; (6) a reheat circuit comprising a reheat heat exchanger to reheat the air when the system is in a dehumidification mode, and operable to act as an auxiliary condenser when the system is in a heating mode, where the space heat exchanger and the reheat heat exchanger are positioned in an air flow path for conditioning the air in the space; (7) first and second expansion devices; and (8) first and second expansion device bypass circuits configured to allow refrigerant to bypass the first and second expansion devices, respectively, the first and second bypass circuits comprising first and second check valves, respectively, to control a direction of refrigerant flow in the first and second bypass circuits; and (9) a 3-way valve configured to selectively direct refrigerant flow to the first expansion device, the reheat circuit, and the second expansion device.

The compressor may be a variable capacity compressor. The heat pump system may include a liquid pump associated with the source heat exchanger and the pump may be a variable capacity pump. The heat pump system may include a fan associated with the space heat exchanger and the fan may be a variable airflow fan. The bypass valve may be bi-directional. The first and second expansion devices may be fixed orifice devices, mechanical valves, or electronic valves. The first expansion device may be positioned between the source heat exchanger and the 3-way valve. The second expansion device may be positioned between the reheat circuit and the space heat exchanger. The reheat circuit may include a reheat bypass valve to modulate refrigerant flow through the reheat heat exchanger.

The heat pump system may include a controller comprising a processor and memory on which one or more software programs are stored, the controller configured to control operation of the reversing valve, the bypass valve, the 3-way valve, and the first and second expansion devices, the compressor, the liquid pump for circulating water or brine solution through the source heat exchanger, and the fan for flowing air over the space heat exchanger and the reheat heat exchanger.

To operate the system in a cooling mode, the controller may be configured to: (a) close the bypass valve to cause refrigerant flow through the source heat exchanger; (b) close the first expansion device to cause refrigerant flow through the first expansion device bypass circuit and the first check valve; (c) control the 3-way valve to inactivate the reheat circuit and to cause refrigerant flow to the second expansion device; (d) control an opening of the second expansion device to cause refrigerant flow through the second expansion device, and thereafter, the space heat exchanger, wherein an orientation of the second check valve prohibits flow of refrigerant through the second expansion device bypass circuit; and (e) control the reversing valve to cause refrigerant flow from the discharge outlet port of the compressor to the source heat exchanger and to return flow from the space heat exchanger to the suction inlet port of the compressor.

To operate the system in the dehumidification mode, the controller may be configured to: (a) control an opening of the bypass valve to modulate refrigerant flow through the source heat exchanger and through the source heat exchanger bypass circuit; (b) close the first expansion device to cause refrigerant flow through the first expansion device bypass circuit and the first check valve; (c) control the 3-way valve to cause refrigerant flow from the first expansion device bypass circuit to the reheat circuit, and thereafter, to the second expansion device; (d) control an opening of the second expansion device to cause refrigerant flow through the second expansion device, and thereafter, the space heat exchanger, wherein an orientation of the second check valve prohibits flow of refrigerant through the second expansion device bypass circuit; and (e) control the reversing valve to cause refrigerant flow from the discharge outlet port of the compressor to the source heat exchanger and to return flow from the space heat exchanger to the suction inlet port of the compressor. The controller may be configured to control an opening of a reheat bypass valve positioned along the reheat circuit to modulate refrigerant flow through the reheat heat exchanger.

To operate the system in the heating mode, the controller may be configured to: (a) control the reversing valve to cause refrigerant flow from the discharge outlet port of the compressor to the space heat exchanger and to return flow from the source heat exchanger to the suction inlet port of the compressor; (b) close the second expansion device to cause refrigerant flow through the second expansion device bypass circuit and the second check valve, and thereafter, the reheat heat exchanger; (c) control the 3-way valve to cause refrigerant flow in the reheat circuit, and thereafter, to the first expansion device; (d) control an opening of the first expansion device to cause refrigerant flow through the first expansion device, wherein an orientation of the first check valve prohibits flow of refrigerant through the first expansion device bypass circuit; and (e) close the bypass valve to cause refrigerant flow through the source heat exchanger. The controller may be configured to control an opening of a reheat bypass valve positioned along the reheat circuit to modulate refrigerant flow through the reheat heat exchanger.

In one embodiment, a method of conditioning air in a space is disclosed, comprising the steps of: (1) providing a heat pump loop comprising a refrigerant circuit that fluidly interconnects (a) a compressor having a discharge outlet port and an inlet suction port; (b) a source heat exchanger operable as either a condenser or an evaporator; (c) a source heat exchanger bypass circuit comprising a bypass valve to modulate refrigerant flow through the source heat exchanger; (d) a space heat exchanger operable as either an evaporator or a condenser for cooling or heating the air in the space; (e) a reversing valve positioned on the discharge side of the compressor and configured to alternately direct refrigerant flow from the discharge outlet port of the compressor to one of the source heat exchanger and the space heat exchanger and to alternately return flow from the other of the source heat exchanger and the space heat exchanger to the suction inlet port of the compressor; (f) a reheat circuit comprising a reheat heat exchanger to reheat the air when the system is in a dehumidification mode, and operable to act as an auxiliary condenser when the system is in a heating mode, wherein the space heat exchanger and the reheat heat exchanger are positioned in an air flow path for conditioning the air in the space; (g) first and second expansion devices; (h) first and second expansion device bypass circuits configured to allow refrigerant to bypass the first and second expansion devices, respectively, the first and second bypass circuits comprising first and second check valves, respectively, to control a direction of refrigerant flow in the first and second bypass circuits; (i) a 3-way valve configured to selectively direct refrigerant flow to the first expansion device, the reheat circuit, and the second expansion device; and (2) operating a control system configured to operate the heat pump loop in a plurality of modes in response to air conditioning demands in the space, wherein the plurality of modes includes a cooling mode, the heating mode, and the dehumidification mode.

In connection with the foregoing method, the compressor may be a variable capacity compressor; the bypass valve may be bi-directional; the heat pump system may include a liquid pump associated with the source heat exchanger and the pump may be a variable capacity pump; the heat pump system may include a fan associated with the space heat exchanger and the fan may be a variable airflow fan; the first and second expansion devices may be fixed orifice devices, mechanical valves, or electronic valves; the first expansion device may be positioned between the source heat exchanger and the 3-way valve; the second expansion device may be positioned between the reheat circuit and the space heat exchanger; the reheat circuit may include a reheat bypass valve to modulate refrigerant flow through the reheat heat exchanger; and the reheat circuit may include a reheat bypass valve to modulate refrigerant flow through the reheat heat exchanger.

The control system may include a controller comprising a processor and memory on which one or more software programs are stored, the controller configured to control operation of the reversing valve, the bypass valve, the 3-way valve, and the first and second expansion devices, the compressor, the liquid pump for circulating water or brine solution through the source heat exchanger, and the fan for flowing air over the space heat exchanger and the reheat heat exchanger.

Operating the controller in the cooling mode may include the steps of: (i) closing the bypass valve to cause refrigerant flow through the source heat exchanger; (ii) closing the first expansion device to cause refrigerant flow through the first expansion device bypass circuit and the first check valve; (iii) controlling respective openings in the 3-way valve to inactivate the reheat circuit and to cause refrigerant flow to the second expansion device; (iv) controlling an opening of the second expansion device to cause refrigerant flow through the second expansion device, and thereafter, the space heat exchanger, wherein an orientation of the second check valve prohibits flow of refrigerant through the second expansion device bypass circuit; and (v) controlling the reversing valve to cause refrigerant flow from the discharge outlet port of the compressor to the source heat exchanger and to return flow from the space heat exchanger to the suction inlet port of the compressor.

Operating the controller in the dehumidification mode may include the steps of: (i) controlling an opening of the bypass valve to modulate refrigerant flow through the source heat exchanger and through the source heat exchanger bypass circuit; (ii) closing the first expansion device to cause refrigerant flow through the first expansion device bypass circuit and the first check valve; (iii) controlling respective openings in the 3-way valve to cause refrigerant flow from the second expansion device bypass circuit to the reheat circuit, and thereafter, to the second expansion device; (iv) controlling an opening of the second expansion device to cause refrigerant flow through the second expansion device, and thereafter, the space heat exchanger, wherein an orientation of the second check valve prohibits flow of refrigerant through the second expansion device bypass circuit; and (v) controlling the reversing valve to cause refrigerant flow from the discharge outlet port of the compressor to the source heat exchanger and to return flow from the space heat exchanger to the suction inlet port of the compressor. The method may include the step of controlling an opening of a reheat bypass valve positioned along the reheat circuit to modulate refrigerant flow through the reheat heat exchanger.

Operating the controller in the heating mode may include the steps of: (i) controlling the reversing valve to cause refrigerant flow from the discharge outlet port of the compressor to the space heat exchanger and to return flow from the source heat exchanger to the suction inlet port of the compressor; (ii) closing the second expansion device to cause refrigerant flow through the second expansion device bypass circuit and the second check valve, and thereafter, the reheat heat exchanger; (iii) controlling respective openings in the 3-way valve to cause refrigerant flow in the reheat circuit, and thereafter, to the first expansion device; (iv) controlling an opening of the first expansion device to cause refrigerant flow through the first expansion device, wherein an orientation of the first check valve prohibits flow of refrigerant through the first expansion device bypass circuit; and (v) closing the bypass valve to cause refrigerant flow through the source heat exchanger. The method may include the step of controlling an opening of a reheat bypass valve positioned along the reheat circuit to modulate refrigerant flow through the reheat heat exchanger.

In another embodiment, a heat pump system for conditioning air in a space is disclosed, comprising a heat pump loop comprising a refrigerant circuit that fluidly interconnects: (1) a compressor having a discharge outlet port and an inlet suction port; (2) a source heat exchanger operable as either a condenser or an evaporator; (3) a space heat exchanger operable as either an evaporator or a condenser for cooling or heating the air in the space; (4) an expansion device positioned between the source heat exchanger and the space heat exchanger; (5) a reheat circuit comprising a reheat heat exchanger to reheat the air when the system is in a dehumidification mode, and operable to act as an auxiliary condenser when the system is in a heating mode, wherein the space heat exchanger and the reheat heat exchanger are positioned in an air flow path for conditioning the air in the space; (6) a reversing valve to alternately direct refrigerant flow to one of the source heat exchanger and the space heat exchanger and to alternately return flow from the other of the source heat exchanger and the space heat exchanger to the suction inlet port of the compressor; and (7) a 3-way valve positioned downstream of the compressor and configured to selectively direct refrigerant flow to the reversing valve and the reheat heat exchanger.

The compressor may be a variable capacity compressor. The heat pump system may include a liquid pump associated with the source heat exchanger and the pump may be a variable capacity pump. The heat pump system may include a fan associated with the space heat exchanger and the fan may be a variable airflow fan. The expansion device may be a fixed orifice device, a mechanical valve, or an electronic valve. The reheat circuit may include a reheat bypass valve to modulate refrigerant flow through the reheat heat exchanger. The reheat bypass valve may be bi-directional. The reheat circuit may include a shutoff valve positioned downstream of the reheat heat exchanger and upstream of the reversing valve.

The heat pump system may include a controller comprising a processor and memory on which one or more software programs are stored. The controller may be configured to control operation of the reversing valve, the 3-way valve, the shutoff valve, the expansion device, the compressor, the liquid pump for circulating water or brine solution through the source heat exchanger, and the fan for flowing air over the space heat exchanger and the reheat heat exchanger.

To operate the system in a cooling mode, the controller may be configured to: (a) control the 3-way valve and the shutoff valve to inactivate the reheat circuit and to cause refrigerant flow from the discharge port of the compressor to the 3-way valve, thereafter the reversing valve, and thereafter the source heat exchanger; (b) control an opening of the expansion device to cause refrigerant flow from the source heat exchanger to the expansion device, and thereafter the space heat exchanger; and (c) control the reversing valve to cause refrigerant flow from the 3-way valve to the source heat exchanger and to return flow from the space heat exchanger to the suction inlet port of the compressor.

To operate the system in the dehumidification mode, the controller may be configured to: (a) control the 3-way valve and the shutoff valve to activate the reheat circuit and to cause refrigerant flow from the discharge port of the compressor to the 3-way valve, thereafter the reheat heat exchanger, thereafter the shutoff valve, thereafter, the reversing valve, and thereafter, the source heat exchanger; (b) control an opening of the expansion device to cause refrigerant flow from the source heat exchanger to the expansion device, and thereafter the space heat exchanger; and (c) control the reversing valve to cause refrigerant flow from the reheat circuit to the source heat exchanger and to return flow from the space heat exchanger to the suction inlet port of the compressor. The controller may be configured to control an opening of a reheat bypass valve positioned along the reheat circuit to modulate refrigerant flow through the reheat heat exchanger To operate the system in the heating mode, the controller may be configured to: (a) control the 3-way valve and the shutoff valve to activate the reheat circuit and to cause refrigerant flow from the discharge port of the compressor to the 3-way valve, thereafter the reheat heat exchanger, thereafter the shutoff valve, thereafter, the reversing valve, and thereafter, the space heat exchanger; (b) control an opening of the expansion device to cause refrigerant flow from the space heat exchanger to the expansion device, and thereafter the source heat exchanger; and (c) control the reversing valve to cause refrigerant flow from the reheat circuit to the space heat exchanger and to return flow from the source heat exchanger to the suction inlet port of the compressor. The controller may be configured to control an opening of a reheat bypass valve positioned along the reheat circuit to modulate refrigerant flow through the reheat heat exchanger.

In another embodiment, a heat pump system for conditioning air in a space is disclosed comprising a heat pump loop comprising a refrigerant circuit that fluidly interconnects: (1) a compressor having a discharge outlet port and an inlet suction port; (2) a source heat exchanger operable as either a condenser or an evaporator; (3) a source heat exchanger bypass circuit comprising a source heat exchanger bypass valve to modulate refrigerant flow through the source heat exchanger; (4) a space heat exchanger operable as either an evaporator or a condenser for cooling or heating the air in the space; (5) a reversing valve positioned on the discharge side of the compressor and configured to alternately direct refrigerant flow from the discharge outlet port of the compressor to one of the source heat exchanger and the space heat exchanger and to alternately return flow from the other of the source heat exchanger and the space heat exchanger to the suction inlet port of the compressor; (6) a reheat heat exchanger to reheat the air when the system is in a dehumidification mode, and operable to act as an auxiliary condenser when the system is in a heating mode and as an auxiliary evaporator when the system is in a cooling mode, wherein the space heat exchanger and the reheat heat exchanger are positioned in an air flow path for conditioning the air in the space; (7) first and second expansion devices; and (8) first and second expansion device bypass circuits configured to allow refrigerant to bypass the first and second expansion devices, respectively, the first and second expansion device bypass circuits comprising first and second expansion device bypass valves, respectively, where the first expansion device is positioned between the source heat exchanger and the reheat heat exchanger and the second expansion device is positioned between the reheat heat exchanger and the space heat exchanger.

The compressor may be a variable capacity compressor. The heat pump system may include a liquid pump associated with the source heat exchanger and the pump is a variable capacity pump. The heat pump system may include a fan associated with the space heat exchanger and the fan may be a variable airflow fan. The second expansion device bypass valve may be bi-directional. The second expansion device bypass circuit may be positioned between the reheat heat exchanger and the space heat exchanger. The first and second expansion devices may be fixed orifice devices, mechanical valves, or electronic valves.

The heat pump system may include a controller comprising a processor and memory on which one or more software programs are stored. The controller may be configured to control operation of the reversing valve, the source heat exchanger bypass valve, the first and second expansion devices, the first and second expansion device bypass valves, the compressor, the liquid pump for circulating water or brine solution through the source heat exchanger, and the fan for flowing air over the space heat exchanger and the reheat heat exchanger.

To operate the system in a cooling mode, the controller may be configured to: (a) close the source heat exchanger bypass valve to cause refrigerant flow through the source heat exchanger; (b) close the first expansion device bypass valve to cause refrigerant flow through the first expansion device and then through the reheat heat exchanger; (c) close the second expansion device to cause refrigerant flow through the second expansion device bypass circuit and then through the space heat exchanger; and (d) control the reversing valve to cause refrigerant flow from the discharge outlet port of the compressor to the source heat exchanger and to return flow from the space heat exchanger to the suction inlet port of the compressor.

To operate the system in the dehumidification mode, the controller may be configured to: (a) control an opening of the source heat exchanger bypass valve to modulate refrigerant flow through the source heat exchanger and through the source heat exchanger bypass circuit; (b) close the first expansion device to cause refrigerant flow through the first expansion device bypass circuit and then through the reheat heat exchanger; (c) close the second expansion device bypass valve to cause refrigerant flow through the second expansion device; (d) control an opening of the second expansion device to modulate refrigerant flow from the reheat heat exchanger through the second expansion device, and thereafter, the space heat exchanger; and (e) control the reversing valve to cause refrigerant flow from the discharge outlet port of the compressor to the source heat exchanger and to return flow from the space heat exchanger to the suction inlet port of the compressor.

To operate the system in the heating mode, the controller may be configured to: (a) close the source heat exchanger bypass valve to cause refrigerant flow through the source heat exchanger; (b) close the first expansion device bypass valve to cause refrigerant flow through the first expansion device and then through the source heat exchanger; (c) close the second expansion device to cause refrigerant flow through the second expansion device bypass circuit and then through the reheat heat exchanger; and (d) control the reversing valve to cause refrigerant flow from the discharge outlet port of the compressor to the space heat exchanger and to return flow from the source heat exchanger to the suction inlet port of the compressor. The controller may be also configured to control an opening of the second expansion device bypass valve to modulate flow through the space heat exchanger and the reheat heat exchanger.

BRIEF DESCRIPTION OF THE DRAWINGS

FIG. 10 is a schematic showing a controller and exemplary heat pump components that may be controlled by the controller.

DETAILED DESCRIPTION

Figure 1:
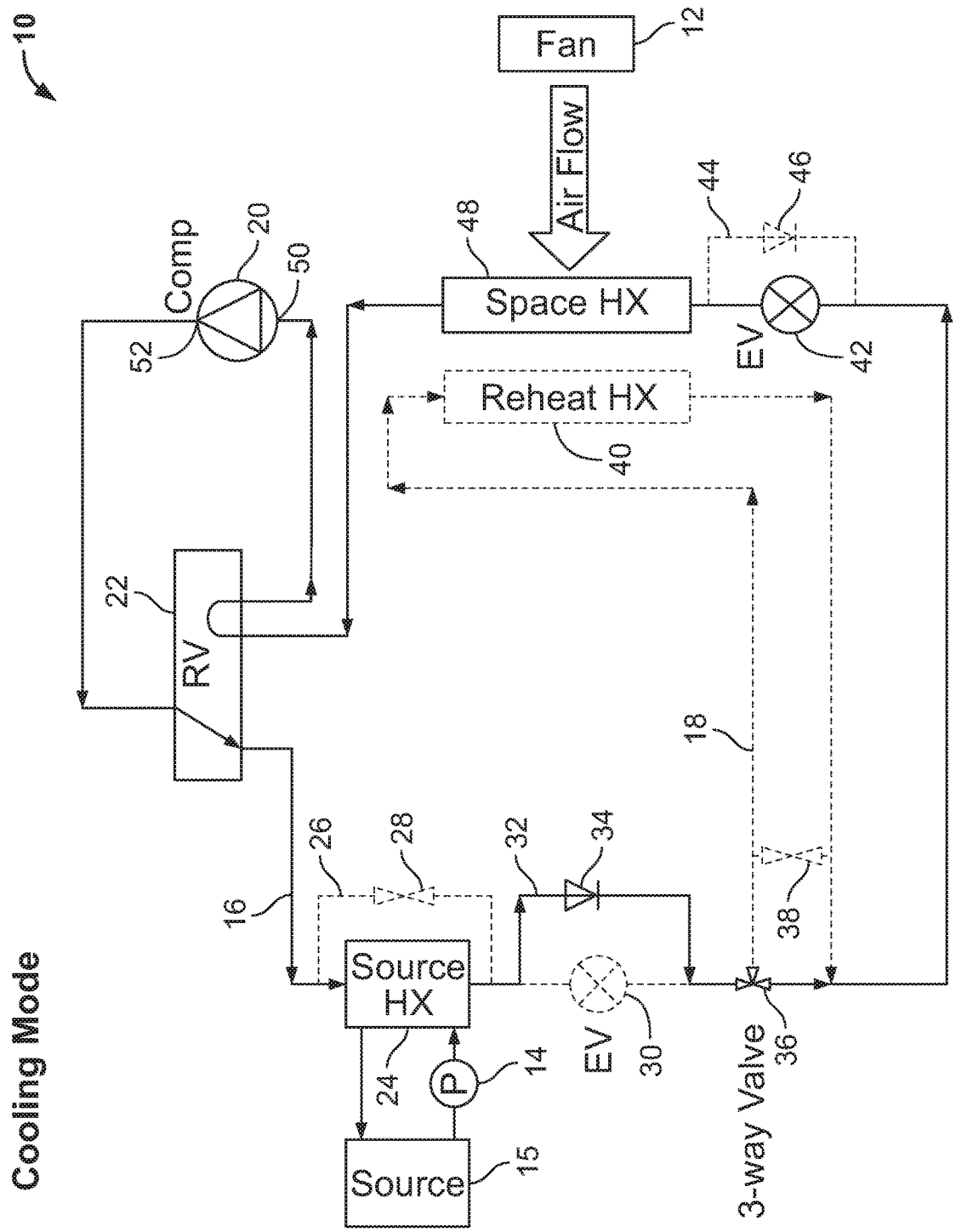
FIG. 1 is a schematic showing an embodiment of a heat pump system of the instant disclosure in a cooling mode.

Although the figures and the instant disclosure describe one or more embodiments of a heat pump system, one of ordinary skill in the art would appreciate that the teachings of the instant disclosure would not be limited to these embodiments. It should be appreciated that any of the features of an embodiment discussed with reference to the figures herein may be combined with or substituted for features discussed in connection with other embodiments in this disclosure.

The instant disclosure provides improved and flexible heat pump operation when dehumidification of a conditioned space is required. In one embodiment of a vapor compression circuit, a reheat heat exchanger is positioned upstream of a 3-way valve with respect to the refrigerant flow. In another embodiment, a reheat heat exchanger is positioned downstream of the 3-way valve but upstream of a source heat exchanger with respect to the refrigerant flow. In yet another embodiment, a reheat heat exchanger is positioned downstream of a source heat exchanger with respect to the refrigerant flow.

All three of the foregoing embodiments provide operational flexibility via a modulating, pulse width modulating (PWM) or rapid cycle solenoid valve diverting at least a portion of the refrigerant around the reheat heat exchanger in the dehumidification mode of operation. Alternatively or additionally, an ON-OFF 3-way valve and a bypass valve may be replaced by the modulating, PWM or rapid cycle solenoid 3-way valve. A controller comprising a processor coupled to memory on which one or more software algorithms are stored may process and issue commands to open, partially open, or close any of the valves disclosed herein. Open or closed feedback loops may be employed to determine current and desired valve positions.

All three of the embodiments may employ variable speed or multi-speed refrigerant and/or source fluid pumps, fan and/or blower motor, and compressor to control dehumidification capability and head pressure. The controller may be configured to operate any or all of these devices to provide the desired system performance. In the heating mode, the reheat heat exchanger may act as an auxiliary condenser or evaporator to enhance system performance and avoid the "cold blow" effect. Any of the expansion valves disclosed herein may be any type of expansion device, including a thermostatic expansion valve, and can be electronic, mechanical, electromechanical, or fixed orifice type. The charge migration or condensation of refrigerant in the reheat heat exchanger can be controlled by a charge compensator or a shutoff valve. The potential oil accumulation in the reheat heat exchanger when the reheat refrigeration circuit is inactive can be controlled by periodically activating the reheat circuit for a short period of time. In at least one of the embodiments described herein, a portion of the existing space heat exchanger may act as a reheat heat exchanger during the dehumidification mode of operation. All of the embodiments described herein provide improved comfort level, system performance, and system reliability.

Figure 2:
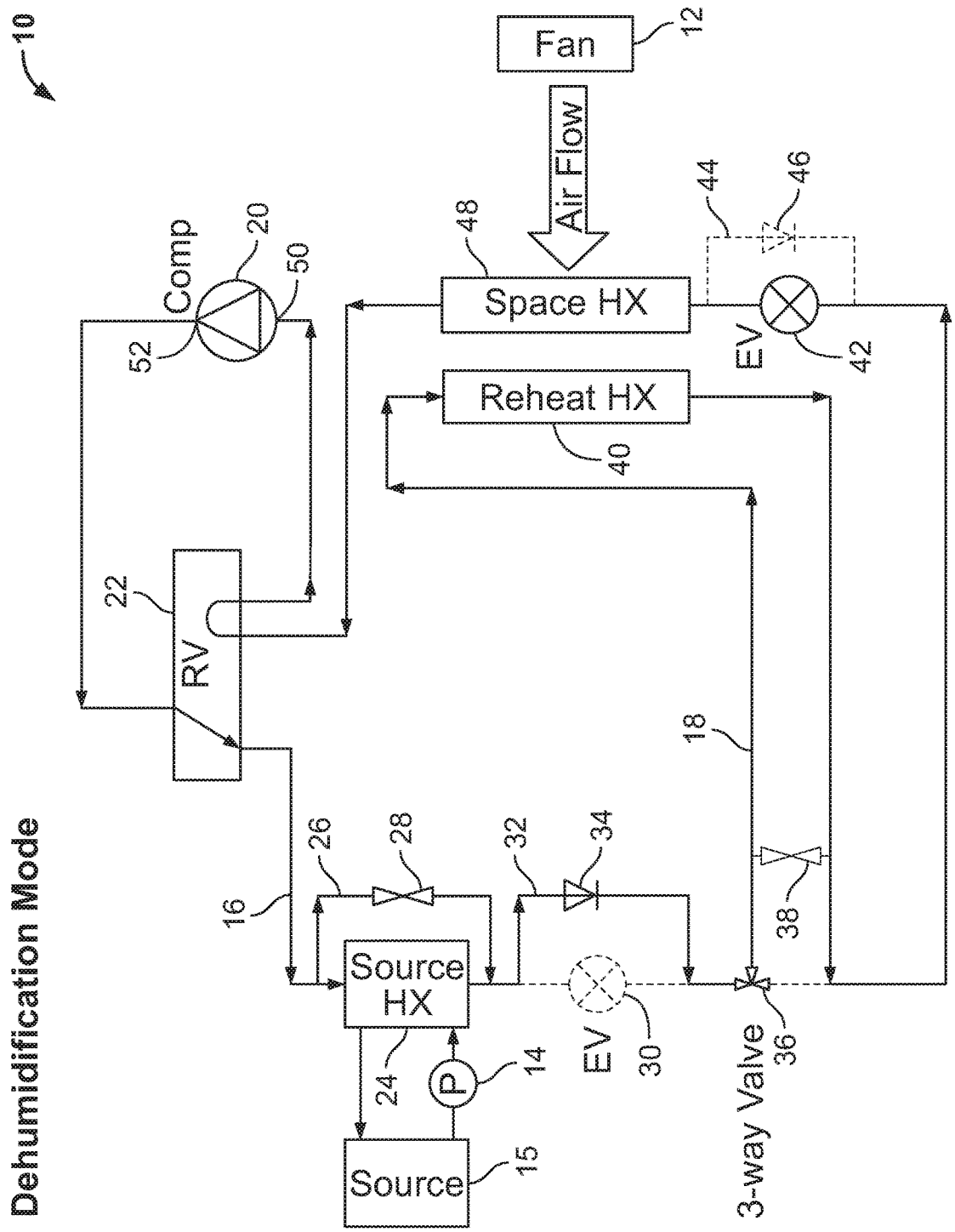
FIG. 2 is a schematic showing the embodiment of FIG. 1 in a dehumidification mode.
Figure 3:
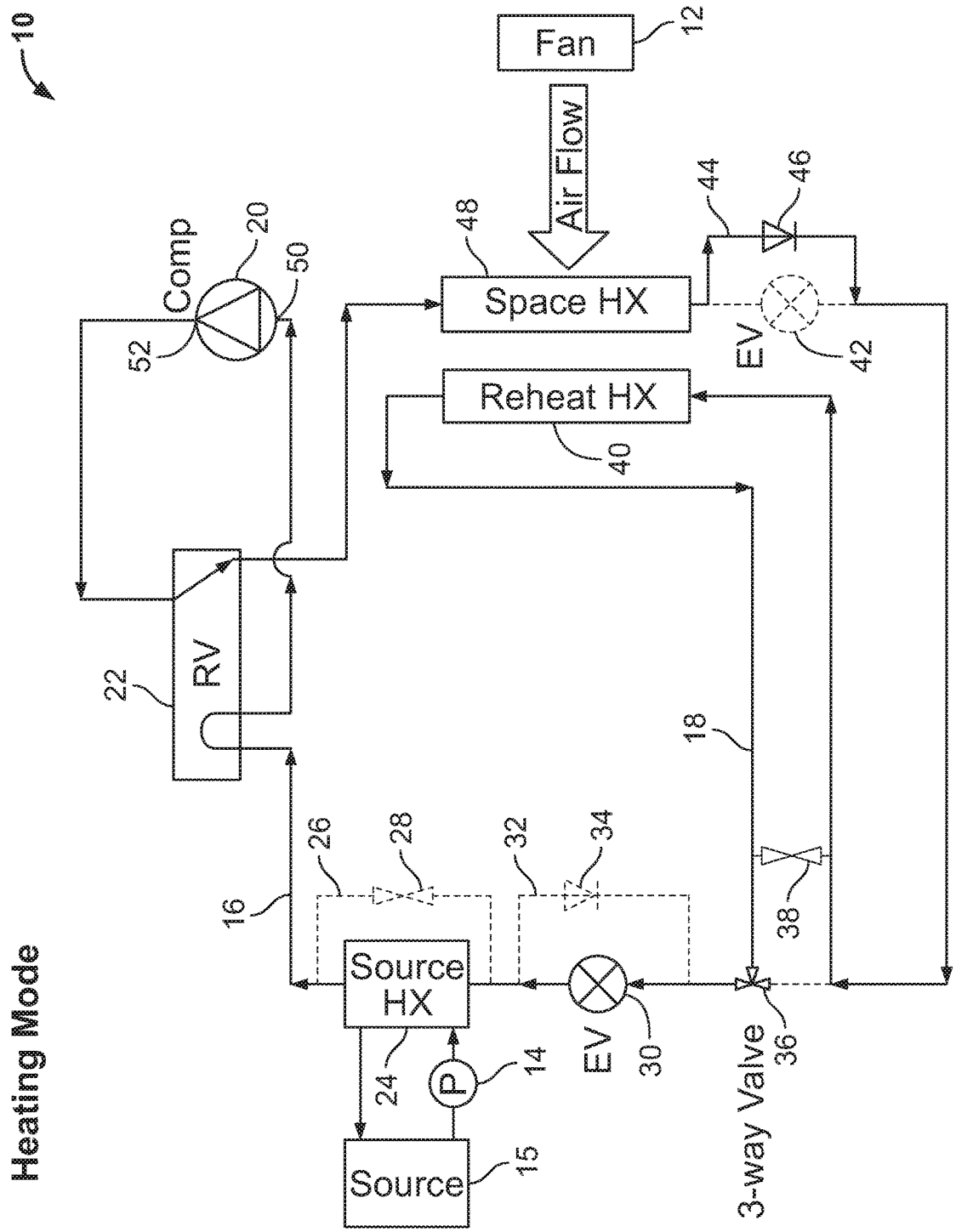
FIG. 3 is a schematic showing the embodiment of FIG. 1 in a heating mode.
Figure 4:
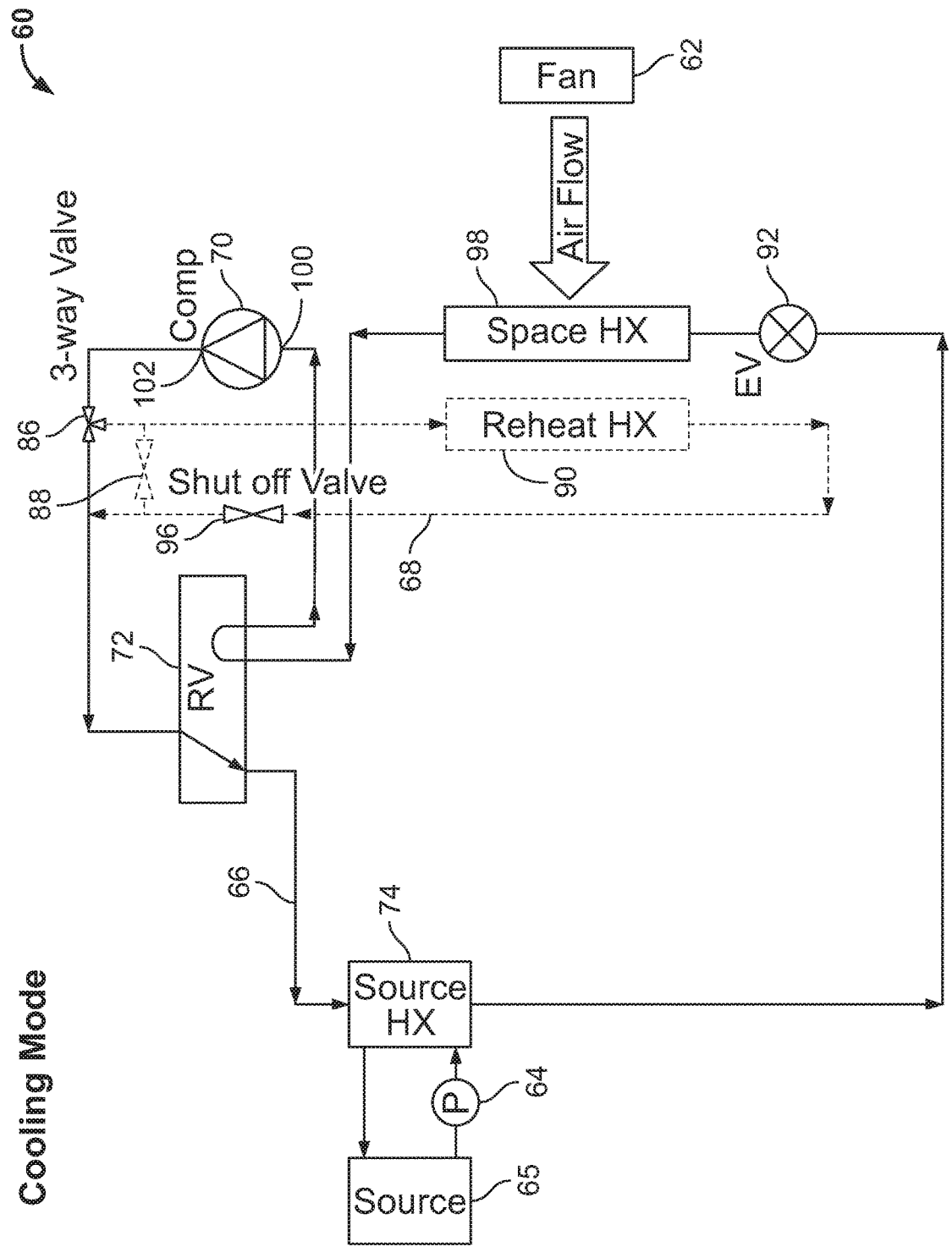
FIG. 4 is a schematic showing another embodiment of a heat pump system of the instant disclosure in a cooling mode.
Figure 5:
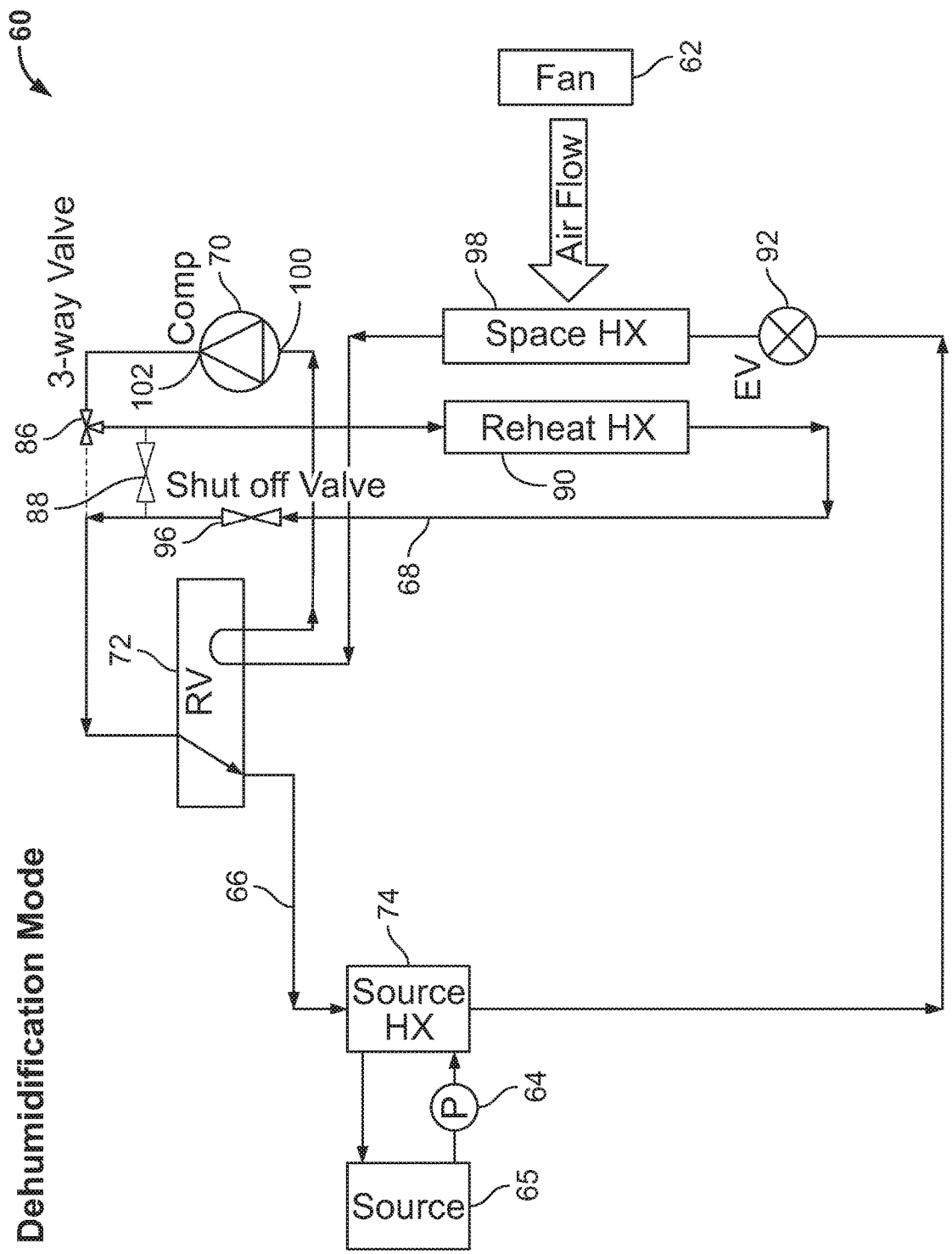
FIG. 5 is a schematic showing the embodiment of FIG. 4 in a dehumidification mode.
Figure 6:
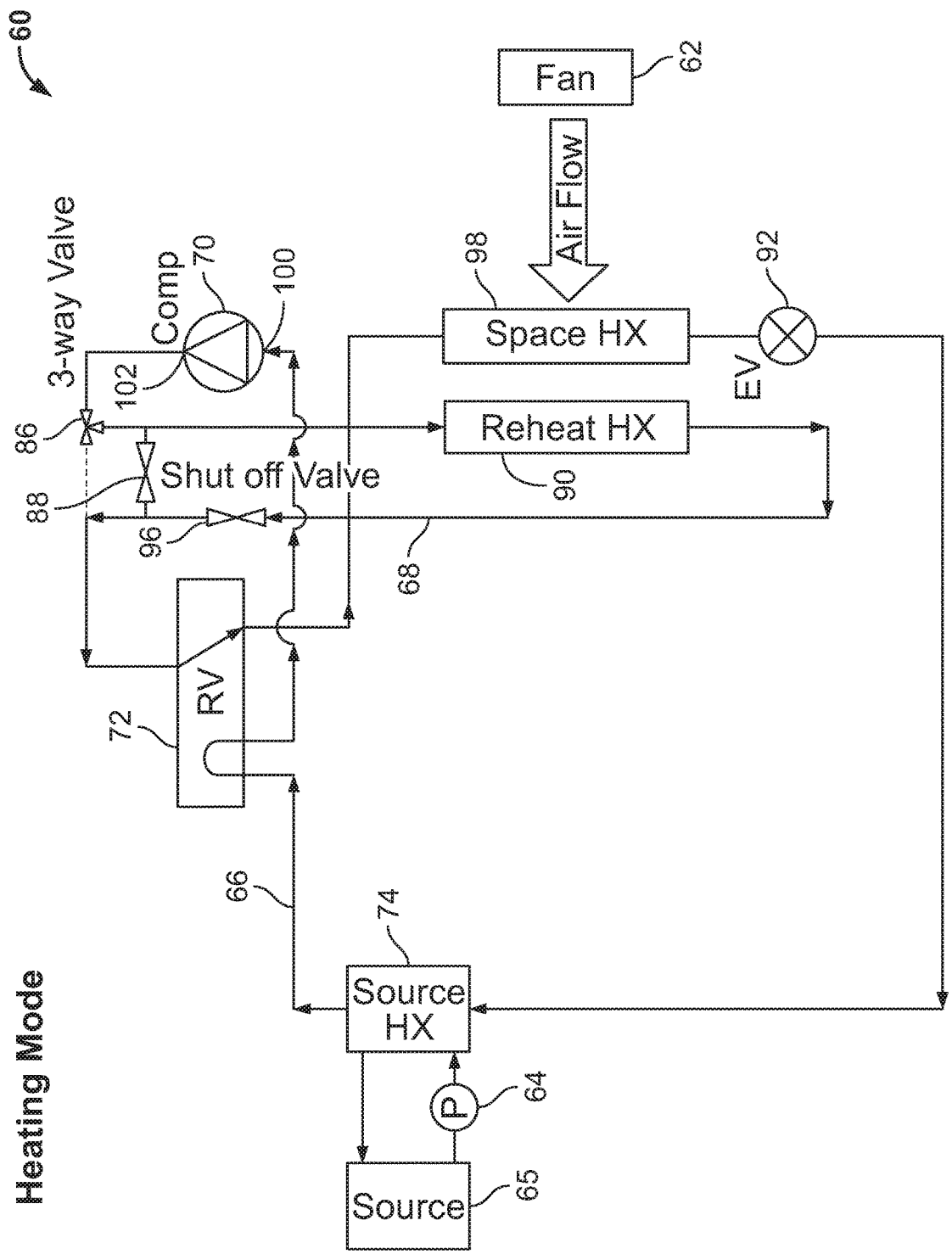
FIG. 6 is a schematic showing the embodiment of FIG. 4 in a heating mode.
Figure 7:
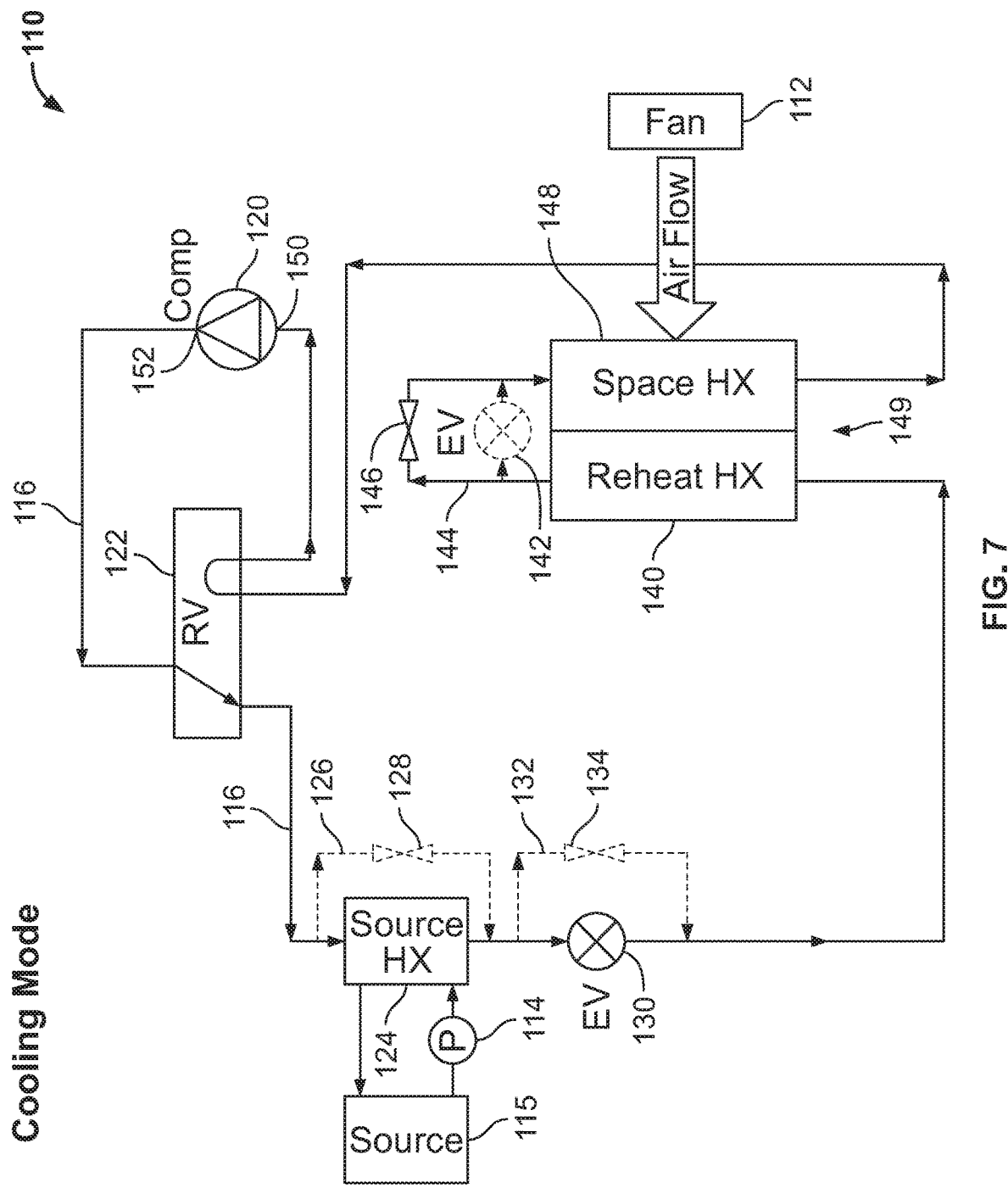
FIG. 7 is a schematic showing another embodiment of a heat pump system of the instant disclosure in a cooling mode.
Figure 8:
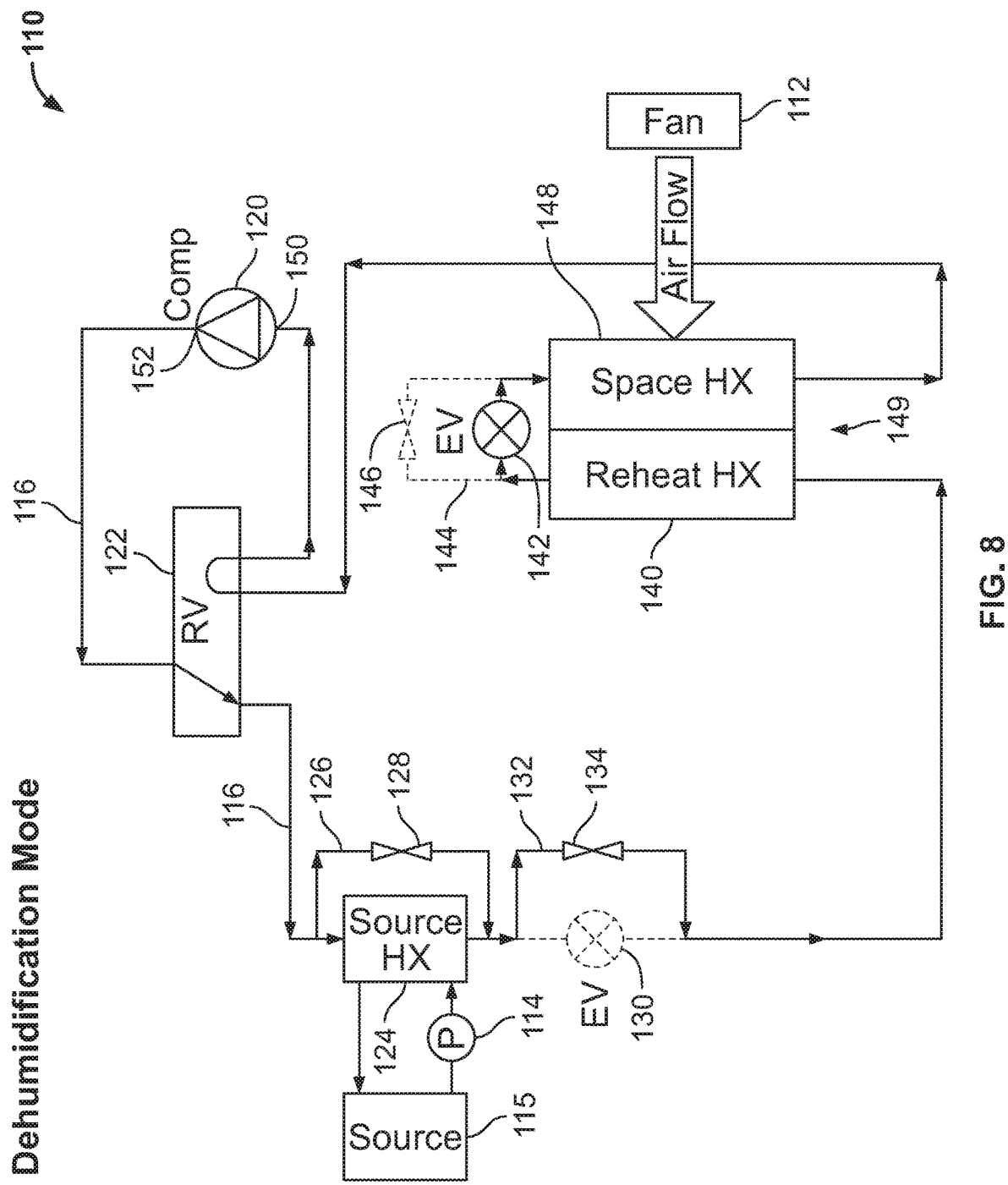
FIG. 8 is a schematic showing the embodiment of FIG. 7 in a dehumidification mode.
Figure 9:
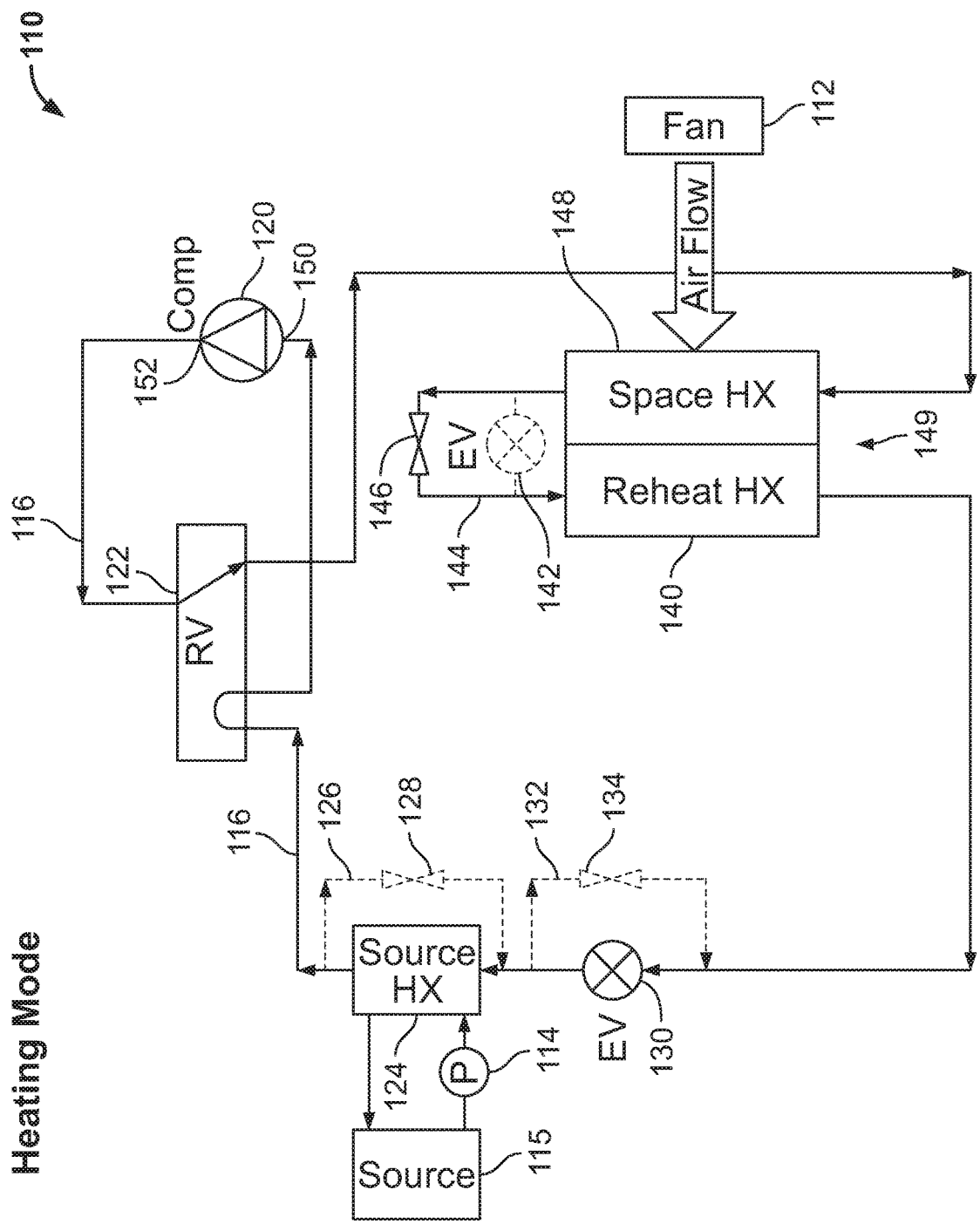
FIG. 9 is a schematic showing the embodiment of FIG. 7 in a heating mode.

Turning now to the drawings and to FIGS. 1-9 in particular, there are shown various embodiments of a heat pump system configured to provide dehumidification of a conditioned space when required. For example, FIGS. 1-3 show heat pump system 10 configured in a cooling mode, a dehumidification mode, and a heating mode, respectively. FIGS. 4-6 show heat pump system 60 configured in a cooling mode, a dehumidification mode, and a heating mode, respectively. FIGS. 7-9 show heat pump system 110 configured in a cooling mode, a dehumidification mode, and a heating mode, respectively. Systems 10, 60, 110 are designed for conditioning the air in a predetermined space. As used herein, "air conditioning" and related terms related to heating, cooling, or dehumidifying the air, and to any combination of these.

In the embodiment of FIGS. 1-3, heat pump system 10 includes a heat pump loop 16 comprising a reheat circuit 18. Heat pump system 10 includes compressor 20; reversing valve 22; source heat exchanger 24; source heat exchanger bypass circuit 26 comprising bypass valve 28; expansion valve 30; expansion valve bypass circuit 32 comprising check valve 34; three-way valve 36; reheat circuit 18 comprising reheat bypass valve 38 and reheat heat exchanger 40; expansion valve 42; expansion valve bypass circuit 44 comprising check valve 46; and space heat exchanger 48. Compressor 20 includes a suction inlet port 50 and a discharge outlet port 52. The heat pump system 10 may include a fan 12 associated with the space heat exchanger 48 and the fan 12 may be a variable airflow fan.

Referring to FIG. 1, heat pump system 10 is shown in a cooling mode with reheat circuit 18 inactive. Compressed gaseous refrigerant exiting the compressor 20 at discharge outlet port 52 is conveyed to the reversing valve 22 where the refrigerant is then conveyed to the source heat exchanger 24 acting as a condenser. In cooling mode, bypass valve 28 is closed, which causes source heat exchanger bypass circuit 26 to be inactive. The capacity (e.g. speed) of the liquid pump 14 circulating the fluid through heat exchanger 24 may be adjusted to control heat rejected by the heat exchanger 24 and system discharge pressure. Likewise, with expansion valve 30 being closed, and with the orientation of check valve 34 permitting flow therethrough, the expansion valve bypass circuit 32 is configured to be active. Thus, all of the refrigerant from the compressor discharge conduit passes through the source heat exchanger 24 and the expansion valve bypass circuit 32, after which the refrigerant is conveyed to three-way valve 36.

Three-way valve 36 is configured to direct the refrigerant to expansion valve 42 rather than entering the reheat circuit 18. With expansion valve bypass circuit 44 inactive due to the opposite flow orientation of check valve 46, the refrigerant is directed to the expansion valve 42 where the refrigerant is metered, expanded and cooled before entering the space heat exchanger 48. Refrigerant conveyed in the coil of the space heat exchanger 48, which acts as an evaporator when system 10 is in cooling mode, absorbs heat from air flowing over the coil of the space heat exchanger 48 thereby cooling the air for conditioning a space. Refrigerant exiting the space heat exchanger 48 is then conveyed to the reversing valve 22, which directs the refrigerant back to the compressor 20 to start the cycle over again. It should be noted that the coil in the reheat heat exchanger 40 may be filled with subcooled liquid refrigerant.

Referring to FIG. 2, system 10 is shown configured in a dehumidification mode. In this mode, the flow of refrigerant through heat pump loop 16 is the same as shown in FIG. 1 except the source heat exchanger bypass circuit 26 may be active (i.e., bypass valve 28 may be fully opened, partially opened, or fully closed to obtain optimum refrigerant conditions at the inlet of the reheat heat exchanger 40), the expansion valve bypass circuit 32 is active (i.e., expansion valve 30 is closed), and the expansion valve bypass circuit 44 is inactive (due to the opposite flow orientation of check valve 46). In addition, rather than three-way valve 36 directing refrigerant to expansion valve 42, three-way valve 36 instead directs the refrigerant to reheat heat exchanger 40, which is positioned downstream of the space heat exchanger 48 relative to air flowing over the respective coils. Thus, air flowing over the coil of the space heat exchanger 48 is cooled and dehumidified by the space heat exchanger 48 and then the air is directed to flow over the reheat heat exchanger 40 to add heat to the air to avoid overcooling the air. Bypass valve 28 may be automatically controlled to be fully opened, partially opened, or fully closed as needed to control the refrigerant inlet condition(s) to reheat heat exchanger 40. Bypass valve 28 may be automatically cycled open and closed and/or controlled on and off with a PWM signal to modulate the amount of refrigerant flowing through the source heat exchanger 24. The capacity (e.g. speed) of the liquid pump 14 circulating the fluid through heat exchanger 24 may be adjusted to control heat rejected by the heat exchanger 24 and system discharge pressure.

If the three-way valve 36 is configured to be adjustable, the three-way valve 36 may control the refrigerant mass flow rate flowing through reheat circuit 18 to provide adjustable outlet air temperature exiting from the coils of the space heat exchanger 48 and reheat heat exchanger 40 for distribution to the air-conditioned space. If the three-way valve 36 is not adjustable, reheat bypass valve 38 may be configured to cause some of the refrigerant flow to bypass the reheat heat exchanger 40 to reduce the mass flow rate entering the reheat heat exchanger 40. The reheat bypass valve 38 may be automatically cycled opened and closed and/or controlled on and off with a PWM signal to modulate the amount of refrigerant flowing through the reheat heat exchanger 40.

Referring to FIG. 3, system 10 is shown configured in a heating mode with added capacity for heating the conditioned air using the reheat heat exchanger 40. In this mode, hot gaseous refrigerant exiting the compressor 20 at discharge outlet port 52 is directed to reversing valve 22, which directs the refrigerant to the space heat exchanger 48. Space heat exchanger 48 acts as a condenser when system 10 is in heating mode. With a closed expansion valve 42, refrigerant exiting the space heat exchanger 48 is directed to the active expansion valve bypass circuit 44 and through check valve 46. The refrigerant is then conveyed to the reheat heat exchanger 40. To heat a space, air flowing over space heat exchanger 48 picks up heat from the space heat exchanger 48 before the air is directed to flow over the reheat heat exchanger 40 to pick up additional heat. Reheat heat exchanger 40 therefore acts as an auxiliary condenser in this heating mode.

Refrigerant exiting the reheat heat exchanger is then directed to three-way valve 36, which directs the flow to expansion valve 30 while expansion valve bypass circuit 32 is inactive. The expansion valve 30 expands the refrigerant thereby cooling the refrigerant before entering the source heat exchanger 24 while source heat exchanger bypass circuit 26 is inactive (i.e., bypass valve 28 is closed). The source heat exchanger 24 acts as an evaporator to fully evaporate the refrigerant before the refrigerant is directed to the reversing valve 22, which directs the refrigerant to the suction inlet port 50 of the compressor 20 to continue the cycle. With the reheat heat exchanger 40 acting as an auxiliary condenser, system 10 may improve the subcooling and consequently the capacity and efficiency of system 10 while in this heating mode, as well as increase supply air temperature preventing the "cold blow" effect. In cold climates, reheat heat exchanger 40 provides additional heating capacity to avoid auxiliary (e.g. electric) heaters.

Referring to FIGS. 4-6, there is shown another embodiment of a heat pump system configured in a cooling mode, a dehumidification mode, and a heating mode, respectively. Heat pump system 60 includes heat pump loop 66 comprising reheat circuit 68. Heat pump loop 66 includes compressor 70, reversing valve 72, source heat exchanger 74, expansion valve 92, space heat exchanger 98, and three-way valve 86. Reheat circuit 68 of heat pump loop 66 includes reheat heat exchanger 90, reheat bypass valve 88, and shutoff valve 96. Compressor 70 includes suction inlet port 100 and discharge outlet port 102. Three-way valve 86 is positioned downstream of the compressor discharge outlet port 102 of compressor 70 and upstream of reversing valve 72. The heat pump system 60 may include a fan 62 associated with the space heat exchanger 98 and the fan 62 may be a variable airflow fan.

Unlike heat pump system 10, heat pump system 60 does not require expansion valve bypass circuits. And although the reheat heat exchanger is positioned downstream of the space heat exchanger in terms of the direction of air flowing over the coils of these two heat exchangers, the refrigerant connection conduits for the reheat circuit 68 connect with the heat pump loop 66 downstream of the compressor 70 and upstream of the reversing valve 72. Similarly to the previous embodiment, the bypass around source heat exchanger 74 may be applied, but not shown for simplicity.

Referring FIG. 4, heat pump system 60 is shown configured in a cooling mode with the reheat circuit 68 inactive. Hot gaseous refrigerant exiting the discharge outlet port 102 of compressor 70 is directed by a conduit to the three-way valve 86, which directs the gas to reversing valve 72, which in turn directs the gas to source heat exchanger 74. Refrigerant exiting source heat exchanger 74 acting as a condenser is directed to expansion valve 92. Refrigerant exiting the expansion valve 92 is directed to space heat exchanger 98. Refrigerant exiting space heat exchanger 98 acting as an evaporator is directed to the reversing valve 72, which in turn directs the gas back to the suction inlet port 100 of compressor 70. Shutoff valve 96 in combination with proper control of three-way valve 86 insures that hot gas from the compressor 70 does not enter reheat circuit 68 when heat pump system 10 is operating in cooling mode. Refrigerant conveyed in the coil of the space heat exchanger 98 absorbs heat from air flowing over the space heat exchanger 98 thereby cooling the air for conditioning a space.

Referring to FIG. 5, heat pump system 60 is shown configured in a dehumidification mode. In this mode, reheat circuit 68 is active. Hot gaseous refrigerant exiting compressor 70 at discharge outlet port 102 is directed to three-way valve 86, which in turn directs the refrigerant to reheat heat exchanger 90 positioned downstream of space heat exchanger 98 such that air cooled after flowing across the space heat exchanger 98 is then caused to flow over the reheat heat exchanger 90 to pick up an heat, thereby preventing overcooling the air distributed to the air-conditioned space.

Refrigerant exiting reheat heat exchanger 90 is directed to open shutoff valve 96. The refrigerant is then directed to reversing valve 72, which directs the refrigerant to source heat exchanger 74 to exchange heat with the source fluid. The refrigerant is then conveyed to the expansion valve 92, which expands and therefore causes the pressure and temperature reduction of the refrigerant, before refrigerant enters space heat exchanger 98. Refrigerant exiting the space heat exchanger 98 acting as an evaporator is then directed to the reversing valve 72, which in turn directs the refrigerant back to the suction inlet port 100 of compressor 70. Thus, air flowing over the space heat exchanger 98 is cooled by the space heat exchanger 98 and then the air is directed to flow over the reheat heat exchanger 98 to add heat to the air to prevent overcooling the air.

The three-way valve 86 may be adjustable as described above to adjust the refrigerant mass flow rate provided to the reheat circuit 68 for optimum supply air temperature that is distributed to the air-conditioned space. Alternatively, as described above, the three-way valve may not be adjustable. In that case, reheat bypass valve 88 may be configured as a simple on-off valve. As described above, reheat bypass valve 88, may be controlled via a PWM algorithm that controls the mass flow rate of refrigerant entering reheat heat exchanger 90 by cycling reheat bypass valve 88 open and closed according to the algorithm. The capacity (e.g. speed) of the liquid pump 64 circulating the fluid through heat exchanger 74 may be adjusted to control heat rejected by the heat exchanger 74 and system discharge pressure.

Referring to FIG. 6, heat pump system 60 is shown configured in a heating mode. In this mode, reheat circuit 68 is active (i.e., reheat bypass valve 88 is closed) and the reheat heat exchanger 90 acts as an additional condenser to supplement the air heating capacity of space heat exchanger 98 to heat air flowing across the space heat exchanger 98 and reheat heat exchanger 90.

In this mode, hot gaseous refrigerant exiting the discharge outlet port 102 of compressor 70 is directed to three-way valve 86, which in turn directs the refrigerant to reheat heat exchanger 90. The refrigerant is then directed to open shutoff valve 96, after which the refrigerant is directed to reversing valve 72. The refrigerant is then conveyed to space heat exchanger 98, after which the refrigerant is conveyed to the expansion valve 92. The expanded refrigerant of reduced pressure and temperature after passing through the expansion valve 92 is then conveyed to the source heat exchanger 74, which acts as an evaporator. The refrigerant discharged from the source heat exchanger 74 is conveyed to the reversing valve 72, which directs the refrigerant back to the suction inlet port 100 of compressor 70.

To heat a space, air flowing over the space heat exchanger 98 picks up heat from the space heat exchanger 98 before the air is directed to flow over the reheat heat exchanger 90 to pick up additional heat. Reheat heat exchanger 90 therefore acts as an auxiliary condenser in this heating mode. The extra condenser provided by reheat heat exchanger 90 helps to increase the heat transfer to the air, increase the subcooling of the refrigerant, and increase the capacity and efficiency of heat pump system 60, as well as increase temperature of the air supplied to a conditioned space therefore avoiding a "cold blow" effect. The capacity (e.g. speed) of the liquid pump 64 circulating the fluid through heat exchanger 74 may be adjusted to control heat rejected by the heat exchanger 74 and system discharge pressure.

FIG. 7-9 shows another embodiment of a heat pump system. As shown in the figures, heat pump system 110 includes compressor 120 comprising suction inlet port 150 and discharge outlet port 152, reversing valve 122, source heat exchanger 124, source heat exchanger bypass circuit 126 comprising bypass valve 128, expansion valve 130, expansion valve bypass circuit 132 comprising bypass valve 134, reheat heat exchanger 140, expansion valve 142, expansion valve bypass circuit 144 comprising bypass valve 146, and space heat exchanger 148. The heat pump system 110 may include a fan 112 associated with the space heat exchanger 148 and the fan 112 may be a variable airflow fan.

Heat pump system 110 is schematically similar to heat pump system 10, but instead of employing two different air coils, a larger space coil is employed. In this embodiment, expansion valve bypass circuit 144 and expansion valve 142 of heat pump system 110 are positioned between reheat heat exchanger 140 and space heat exchanger 148 and therefore divide the larger space coil into two parts. One part may be used as a reheat coil and the other part may be used as a main space heating/cooling coil.

Referring to FIG. 7, heat pump system 110 is shown in a cooling mode. Hot gaseous refrigerant exiting the discharge outlet port 152 of compressor 120 is directed by a conduit to the reversing valve 122, which in turn directs the refrigerant gas to source heat exchanger 124. Refrigerant exiting source heat exchanger 124 acting as a condenser is directed to expansion valve 130, which is configured to meter, expand and cool the refrigerant before the refrigerant enters reheat heat exchanger 140, which is the first stage of the two-stage space heat exchanger 149. Upon exiting the reheat heat exchanger 140 acting as an evaporator, the refrigerant bypasses a closed expansion valve 142. The refrigerant instead is conveyed through expansion valve bypass circuit 144 and bypass valve 146 to then flow through the space heat exchanger 148, which is the second stage of the two-stage space heat exchanger 149. In cooling mode, space heat exchanger 148 acts as an extension of the evaporator provided by reheat heat exchanger 140 to increase the size of the evaporator. Thus, refrigerant conveyed in the space heat exchanger 148 and the reheat heat exchanger 140 absorbs heat from air flowing over these coils to cool the air for conditioning a space.

For control purposes, bypass valve 146 may be automatically cycled open and closed and/or controlled on and off with a PWM signal. Refrigerant exiting the space heat exchanger 148 is conveyed to reversing valve 122, which directs the refrigerant to suction inlet port 150 of compressor 120.

Referring to FIG. 8, heat pump system 110 is shown in a dehumidification mode. In this mode, hot gaseous refrigerant exiting the discharge outlet port 152 of compressor 120 is directed to the reversing valve 122, which in turn directs the refrigerant to source heat exchanger 124 acting as a condenser. As shown in the figure, source heat exchanger bypass circuit 126 is active via bypass valve 128, and the expansion valve bypass circuit 132 is active via bypass valve 134. Consequently, some, none, or all of the heated refrigerant may be permitted to flow through the source heat exchanger 124, and some, none, or all of the refrigerant may be permitted to flow through the source heat exchanger bypass circuit 126 to obtain optimum refrigerant conditions at the inlet of reheat heat exchanger 140. Bypass valve 128 controls the amount of refrigerant mass flow that traverses through the source heat exchanger bypass circuit 126, which affects the amount of refrigerant mass flow traversing through the source heat exchanger 124. Bypass valve 128 may be automatically cycled open and closed and/or controlled on and off with a PWM signal to modulate the amount of refrigerant flowing through the source heat exchanger bypass circuit 126. The capacity (e.g. speed) of the liquid pump 114 circulating the fluid through heat exchanger 124 may be adjusted to control heat rejected by the heat exchanger 124 and system discharge pressure.

Refrigerant exiting the source heat exchanger 124 acting as a condenser and source heat exchanger bypass circuit 126 are combined and then directed to expansion valve bypass circuit 132. In dehumidification mode, none of the refrigerant enters the expansion valve 130.

Refrigerant exiting the expansion bypass circuit 132 is directed to reheat heat exchanger 140. Upon exiting reheat heat exchanger 140 and with bypass valve 146 being closed, subcooled refrigerant is directed to expansion valve 142, which meters, expands and cools the refrigerant before the refrigerant enters space heat exchanger 148 acting as an evaporator. Upon leaving space heat exchanger 148, the refrigerant is directed to the reversing valve 122, which then directs the flow back to the suction inlet port 150 of compressor 120. Thus, air flowing over the space heat exchanger 148 is cooled by the space heat exchanger 148 and then the air is directed to flow over the reheat heat exchanger 140 to add heat to prevent overcooling the air.

Referring to FIG. 9, heat pump system 110 is configured in a heating mode. For example, hot gaseous refrigerant leaving the discharge outlet port 152 of compressor 120 is directed to reversing valve 122, which directs the refrigerant to space heat exchanger 148 acting as a condenser. Refrigerant exiting space heat exchanger 148 is directed to bypass valve 146, which in turn directs the refrigerant to reheat heat exchanger 140. The expansion valve 142 is not needed for heating mode. To heat a space, air flowing over the coil of space heat exchanger 148 picks up heat from the space heat exchanger 148 before the air is directed to flow over the reheat heat exchanger 140 to pick up additional heat. Reheat heat exchanger 140 therefore acts as an auxiliary condenser in this heating mode.

Refrigerant leaving reheat heat exchanger 140 is directed to expansion valve 130. Expansion valve bypass circuit 132 and source heat exchanger bypass circuit 126 are not active (i.e., bypass valves 128, 134 are closed) when heat pump system 110 is configured in the heating mode. Refrigerant leaving the expansion valve 130 is directed to source heat exchanger 124 acting as an evaporator to exchange heat with the source fluid. Refrigerant leaving source heat exchanger 124 is then directed the reversing valve 122, which directs the refrigerant back to the suction inlet port 150 of compressor 120. The extra condenser provided by reheat heat exchanger 140 helps to increase the heat transfer to the air, increase the subcooling of the refrigerant, and increase the capacity and efficiency of heat pump system 110, as well as increase temperature of the air supplied to a conditioned space therefore avoiding a "cold blow" effect. The capacity (e.g. speed) of the liquid pump 114 circulating the fluid through heat exchanger 124 may be adjusted to control heat rejected by the heat exchanger 124 and system discharge pressure.

Heat pump loops 16, 66, 116 include a conduit through which refrigerant flows and which fluidly connects the components of heat pump systems 10, 60, 110 to one another. Compressors 20, 70, 120 may each be a variable capacity compressor, such as a variable speed compressor, a compressor with an integral pulse-width modulation option, or a compressor incorporating various unloading options. These types of compressors allow for better control of the operating conditions and management of the thermal load on the heat pump loops 16, 66, 116.

Reversing valves 22, 72, 122 are positioned along the conduit on the discharge side of compressors 20, 70, 120 and are configured to selectively operate the heat pump loops 16, 66, 116 in a cooling mode, a dehumidification mode, and a heating mode by controlling the direction of refrigerant flowing in the heat pump loops 16, 66, 116.

Source heat exchangers 24, 74, 124 may each be a refrigerant-to-water, refrigerant-to-brine, or refrigerant-to-air heat exchanger and is not limited to any particular heat exchanger type or configuration. Source heat exchangers 24, 74, 124 are fluidly connected to a source 15, 65, 115, and the fluid, usually but not necessarily water, is circulated by pumps 14, 64, 114. Pumps 14, 64, 114 may be a variable capacity pump (e.g. a variable speed pump, a pump controlled by PWM signal, a cycling ON/OFF pump, a pump with a bypass circuit or other means of unloading) for a more efficient operation and better system control. Similarly, space heat exchangers 48, 98, 148 are not limited to any particular heat exchanger type or configuration.

Expansion valves 30, 42, 92, 130, 142 may each be an electronic expansion valve, a mechanical expansion valve, a fixed-orifice/capillary tube/accurator, or any combination of the these. These valves may have bi-directional functionality or may be replaced by a pair of uni-directional expansion devices coupled with the associated bypass check valves to provide refrigerant rerouting when the flow changes direction throughout the refrigerant cycle between cooling and heating modes of operation.

Valves 28, 38, 88, 96, 128, 146 may each be electronically controllable, mechanically and/or electromechanically actuated valves, and may have bi-directional flow functionality.

Referring to FIG. 10, heat pump systems 10, 60, 110 may include controller 78 comprising processor 80 and memory 82 on which one or more software programs are stored. The controller 78 may be configured to control operation of the check valves 34, 46, the shut off valve 96, the reversing valves 22, 72, 122, the bypass valves 28, 38, 88, 128, 134, 146, the 3-way valves 36, 86, the first and second expansion devices 30, 42, 92, 130, 142, the compressors 20, 70, 120, the liquid pumps 14, 64, 114 for circulating water or brine solution through the source heat exchangers 24, 74, 124, the fans 12, 62, 112 for flowing air over the space heat exchangers 48, 98, 148, and the reheat heat exchangers 40, 90, 140.

While specific embodiments have been described in detail, it will be appreciated by those skilled in the art that various modifications and alternatives to those details could be developed in light of the overall teachings of the disclosure. Accordingly, the disclosure herein is meant to be illustrative only and not limiting as to its scope and should be given the full breadth of the appended claims and any equivalents thereof.

The invention claimed is:

1. A heat pump system for conditioning air in a space, comprising:
   a heat pump loop comprising a refrigerant circuit that fluidly interconnects:
   a variable speed compressor having a discharge outlet port and an inlet suction port;
   a refrigerant-to-liquid source heat exchanger operable as either a condenser or an evaporator for exchanging heat with a source liquid;
   a source heat exchanger bypass circuit comprising a bi-directional bypass valve to modulate refrigerant flow through the source heat exchanger;
   a refrigerant-to-air space heat exchanger operable as either an evaporator or a condenser for cooling or heating the air in the space;
   a reversing valve positioned on the discharge side of the compressor and configured to alternately direct refrigerant flow from the discharge outlet port of the compressor to one of the source heat exchanger and the space heat exchanger and to alternately return flow from the other of the source heat exchanger and the space heat exchanger to the suction inlet port of the compressor;
   a reheat circuit comprising a reheat heat exchanger to reheat the air when the system is in a dehumidification mode, and operable to act as an auxiliary condenser when the system is in a heating mode, wherein the space heat exchanger and the reheat heat exchanger are positioned in an air flow path for conditioning the air in the space;
   first and second electronic bi-directional expansion devices;
   first and second expansion device bypass circuits configured to allow refrigerant to bypass the first and second expansion devices, respectively, the first and second bypass circuits comprising first and second check valves, respectively, to control a direction of refrigerant flow in the first and second bypass circuits; and
   a 3-way valve configured to selectively direct refrigerant flow (i) to the first expansion device from the reheat circuit, (ii) to the reheat circuit from the first expansion device bypass circuit, and (iii) to the second expansion device from the first expansion device bypass circuit,
   wherein the first expansion device is positioned between the source heat exchanger and the 3-way valve, the second expansion device is positioned between the reheat circuit and the space heat exchanger, and the reheat circuit includes a bi-directional reheat bypass valve that loins an upstream leg and a downstream leg of the reheat heat exchanger and is positioned between the second expansion device and the 3-way valve to modulate refrigerant flow through the reheat heat exchanger.

2. The heat pump system of claim 1, including a liquid pump associated with the source heat exchanger and the pump is a variable capacity pump.

3. The heat pump system of claim 1, including a fan associated with the space heat exchanger and the fan is a variable airflow fan.

4. The heat pump system of claim 1, including a controller comprising a processor and memory on which one or more software programs are stored, the controller configured to control operation of the reversing valve, the bypass valve, the 3-way valve, the first and second expansion devices, the compressor, a liquid pump for circulating water or brine solution through the source heat exchanger, and a fan for flowing air over the space heat exchanger and the reheat heat exchanger.

5. The heat pump system of claim 4, wherein to operate the system in a cooling mode, the controller is configured to:
   close the bypass valve to cause refrigerant flow through the source heat exchanger;
   close the first expansion device to cause refrigerant flow through the first expansion device bypass circuit and the first check valve;
   control the 3-way valve to inactivate the reheat circuit and to cause refrigerant flow to the second expansion device;
   control an opening of the second expansion device to cause refrigerant flow through the second expansion device, and thereafter, the space heat exchanger, wherein an orientation of the second check valve prohibits flow of refrigerant through the second expansion device bypass circuit; and
   control the reversing valve to cause refrigerant flow from the discharge outlet port of the compressor to the source heat exchanger and to return flow from the space heat exchanger to the suction inlet port of the compressor.

6. The heat pump system of claim 4, wherein to operate the system in the dehumidification mode, the controller is configured to:
- control an opening of the bypass valve to modulate refrigerant flow through the source heat exchanger and through the source heat exchanger bypass circuit;
- close the first expansion device to cause refrigerant flow through the first expansion device bypass circuit and the first check valve;
- control the 3-way valve to cause refrigerant flow from the first expansion device bypass circuit to the reheat circuit, and thereafter, to the second expansion device;
- control an opening of the second expansion device to cause refrigerant flow through the second expansion device, and thereafter, the space heat exchanger, wherein an orientation of the second check valve prohibits flow of refrigerant through the second expansion device bypass circuit; and
- control the reversing valve to cause refrigerant flow from the discharge outlet port of the compressor to the source heat exchanger and to return flow from the space heat exchanger to the suction inlet port of the compressor.

7. The heat pump system of claim 6, wherein the controller is configured to control an opening of a reheat bypass valve positioned along the reheat circuit to modulate refrigerant flow through the reheat heat exchanger.

8. The heat pump system of claim 4, wherein to operate the system in the heating mode, the controller is configured to:
- control the reversing valve to cause refrigerant flow from the discharge outlet port of the compressor to the space heat exchanger and to return flow from the source heat exchanger to the suction inlet port of the compressor;
- close the second expansion device to cause refrigerant flow through the second expansion device bypass circuit and the second check valve, and thereafter, the reheat heat exchanger;
- control the 3-way valve to cause refrigerant flow in the reheat circuit, and thereafter, to the first expansion device;
- control an opening of the first expansion device to cause refrigerant flow through the first expansion device, wherein an orientation of the first check valve prohibits flow of refrigerant through the first expansion device bypass circuit; and
- close the bypass valve to cause refrigerant flow through the source heat exchanger.

9. The heat pump system of claim 8, wherein the controller is configured to control an opening of a reheat bypass valve positioned along the reheat circuit to modulate refrigerant flow through the reheat heat exchanger.

10. A heat pump system for conditioning air in a space, comprising:
- a heat pump loop comprising a refrigerant circuit that fluidly interconnects:
  - a compressor having a discharge outlet port and an inlet suction port;
  - a source heat exchanger operable as either a condenser or an evaporator for exchanging heat with a source liquid;
  - a source heat exchanger bypass circuit comprising a bypass valve to modulate refrigerant flow through the source heat exchanger;
  - a space heat exchanger operable as either an evaporator or a condenser for cooling or heating the air in the space;
  - a reversing valve positioned on the discharge side of the compressor and configured to alternately direct refrigerant flow from the discharge outlet port of the compressor to one of the source heat exchanger and the space heat exchanger and to alternately return flow from the other of the source heat exchanger and the space heat exchanger to the suction inlet port of the compressor;
  - a reheat circuit comprising a reheat heat exchanger to reheat the air when the system is in a dehumidification mode, and operable to act as an auxiliary condenser when the system is in a heating mode, wherein the space heat exchanger and the reheat heat exchanger are positioned in an air flow path for conditioning the air in the space;
  - first and second electronic bi-directional expansion devices;
  - first and second expansion device bypass circuits configured to allow refrigerant to bypass the first and second expansion devices, respectively, the first and second bypass circuits comprising first and second check valves, respectively, to control a direction of refrigerant flow in the first and second bypass circuits; and
  - a 3-way valve configured to selectively direct refrigerant flow (i) to the first expansion device from the reheat circuit when the heat pump loop is in a heating mode, (ii) to the reheat circuit from the first expansion device bypass circuit when the heat pump loop is in a dehumidification mode, and (iii) to the second expansion device from the first expansion device bypass circuit when the heat pump loop is in a cooling mode,
- wherein the reheat circuit includes a bi-directional reheat bypass valve that joins an upstream leg to a downstream leg of the reheat heat exchanger and is positioned between the second expansion device and the 3-way valve to modulate refrigerant flow through the reheat heat exchanger.

11. The heat pump system of claim 10, wherein the compressor is a variable speed compressor.

12. The heat pump system of claim 10, including a liquid pump associated with the source heat exchanger and the pump is a variable capacity pump.

13. The heat pump system of claim 10, including a variable airflow fan configured to blow air across the space heat exchanger.

14. The heat pump system of claim 10, wherein the bypass valve is bi-directional.

* * * * *